US012493623B2

(12) United States Patent
Kim et al.

(10) Patent No.: US 12,493,623 B2
(45) Date of Patent: Dec. 9, 2025

(54) ELECTRONIC APPARATUS AND CONTROL METHOD THEREFOR

(71) Applicant: SAMSUNG ELECTRONICS CO., LTD., Suwon-si (KR)

(72) Inventors: Yeonghyeok Kim, Suwon-si (KR); Sanga Kim, Suwon-si (KR); Keehwan Ka, Suwon-si (KR); Sunhyung Kim, Suwon-si (KR); Seoyeon Lee, Suwon-si (KR); Najeong Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/114,308

(22) Filed: Feb. 27, 2023

(65) Prior Publication Data

US 2023/0222134 A1    Jul. 13, 2023

Related U.S. Application Data

(63) Continuation of application No. PCT/KR2021/010303, filed on Aug. 4, 2021.

(30) Foreign Application Priority Data

Sep. 18, 2020    (KR) .................. 10-2020-0120832

(51) Int. Cl.
  *G06F 16/248*    (2019.01)
  *G06F 3/0482*    (2013.01)
  *G06F 16/2457*   (2019.01)

(52) U.S. Cl.
  CPC .......... *G06F 16/248* (2019.01); *G06F 3/0482* (2013.01); *G06F 16/24575* (2019.01)

(58) Field of Classification Search
  CPC ................. G06F 16/248; G06F 3/0482; G06F 16/24575; G06F 3/048; G06Q 30/0621;
  (Continued)

(56) References Cited

U.S. PATENT DOCUMENTS 9,576,034 B2    2/2017  Kamei et al.
10,480,990 B1 * 11/2019 Wallace .................. G09B 5/04
                                                707/999.003
(Continued)

FOREIGN PATENT DOCUMENTS

JP    2006-309628 A    11/2006
JP    4237695 B2     3/2009
(Continued)

OTHER PUBLICATIONS

International Search Report issued in International Application No. PCT/KR2021/010303 dated Nov. 24, 2021.
(Continued)

*Primary Examiner* — Yuk Ting Choi
(74) *Attorney, Agent, or Firm* — STAAS & HALSEY LLP

(57) ABSTRACT

An electronic devices comprises a display, a memory and a processor. The processor assigns priorities to a plurality of context information received in relation to a user, respectively, and stores the plurality of context information with the assigned priorities in the memory, modifies at least one item included in a selected recipe on the basis of the priorities assigned to the plurality of context information when the recipe is selected, and controls the display to display a customized recipe including the modified item.

17 Claims, 20 Drawing Sheets

(58) Field of Classification Search
CPC .... G06Q 30/0631; G06Q 50/04; G06Q 50/10; G16H 20/60; G09B 19/0092; H04M 1/72403; H04M 1/725
See application file for complete search history.

(56) References Cited

U.S. PATENT DOCUMENTS

| | | | |
|---|---|---|---|
| 11,250,714 B2 | 2/2022 | Lim | |
| 2013/0224694 A1* | 8/2013 | Moore | G09B 19/0092 434/127 |
| 2014/0089299 A1* | 3/2014 | Kamei | G06Q 50/12 707/722 |
| 2017/0097934 A1* | 4/2017 | Aso | G06Q 30/02 707/722 |
| 2017/0139902 A1* | 5/2017 | Byron | G06Q 10/087 707/737 |
| 2018/0082603 A1 | 3/2018 | Lim | |
| 2018/0157936 A1* | 6/2018 | Lee | G06V 10/764 707/722 |
| 2018/0240359 A1* | 8/2018 | Hujsak | G06N 5/022 707/722 |
| 2019/0164117 A1* | 5/2019 | Wallace | H04L 12/2829 707/722 |
| 2019/0213487 A1* | 7/2019 | Gschwind | G06N 3/065 707/722 |
| 2020/0219606 A1 | 7/2020 | Koh et al. | |
| 2022/0252273 A1* | 8/2022 | Puchinger | F24C 7/08 707/722 |

FOREIGN PATENT DOCUMENTS

| | | |
|---|---|---|
| JP | 5988056 B2 | 9/2016 |
| JP | 6275932 B1 | 2/2018 |
| JP | 2019-061366 A | 4/2019 |
| JP | 2019-133624 A | 8/2019 |
| JP | 2019-164585 A | 9/2019 |
| JP | 6572403 B1 * | 9/2019 |
| JP | 2020-107299 A | 7/2020 |
| KR | 10-2009-0070075 A | 7/2009 |
| KR | 10-2017-0137345 A | 12/2017 |
| KR | 10-2018-0032234 A | 3/2018 |
| KR | 10-2018-0071595 A | 6/2018 |
| KR | 10-2019-0024784 A | 3/2019 |
| KR | 10-2020-0080355 A | 7/2020 |

OTHER PUBLICATIONS

Written Opinion issued in International Application No. PCT/KR2021/010303 dated Nov. 24, 2021.
Request for the Submission of an Opinion issued by the Korean Patent office dated Nov. 28, 2024 for Korean Patent Application No. 10-2020-0120832.

* cited by examiner

ELECTRONIC APPARATUS AND CONTROL METHOD THEREFOR

CROSS-REFERENCE TO RELATED APPLICATIONS

This application is a continuation application, under 35 U.S.C. § 111(a), of international application No. PCT/KR2021/010303, filed on Aug. 4, 2021, which claims priority of a Korean patent application number 10-2020-0120832, filed Sep. 18, 2020, in the Korean Intellectual Property Office, the disclosures of which are incorporated by reference herein in their entirety.

BACKGROUND

Field

Apparatuses and methods consistent with the disclosure relate to an electronic apparatus and a control method therefor, and more particularly, to an electronic apparatus providing recipe information, and a control method therefor.

Description of the Related Art

In accordance with the development of electronic technology, various types of electronic apparatuses have been developed and spread. In particular, display devices that provide a variety of information to users have been continuously developed in recent years to satisfy user needs.

Recently, a variety of customized information reflecting user information is provided through software installed in home appliances as well as TVs and smart phones. For example, although recipe information reflecting a preference of a user is provided through a display device, only the most basic food preference is reflected, which is problematic.

SUMMARY

An electronic apparatus according to an embodiment of the disclosure includes a display, a memory, and a processor configured to, assign priorities to a plurality of context information received in relation to a user, respectively, and store the plurality of context information with the assigned priorities in the memory, modify, based on a recipe being selected, at least one item included in the selected recipe based on the priorities assigned to the plurality of context information, and control the display to display a user-customized recipe including the modified item.

The processor may be configured to preferentially modify at least one item included in the selected recipe based on first context information, among the priorities assigned to the plurality of context information, related to the at least one item included in case that a priority of the first context information is higher than a priority of second context information, among the priorities assigned to the plurality of context information, related to another item included in the selected recipe.

The user may be a first user, the user-customized recipe may be a first customized recipe and the processor may be configured to obtain the customized recipe for the first user based on a plurality of context information related to an eating preference of the first user, obtain a second customized recipe for a second user based on a plurality of context information related to an eating preference of the second user, obtain an integrated customized recipe including an item having a degree of similarity that is equal to or higher than a threshold based on a degree of similarity between items included in the first customized recipe for the first user and the second customized recipe for the second user, and control the display to display the obtained integrated customized recipe.

The processor may be configured to control the display to display the first customized recipe for the first user and the second customized recipe for the second user and control the display to display a guide user interface (UI) for integrating the first customized recipe for the first user and the second customized recipe for the second user.

The user may be a first user, and the processor may be configured to obtain a common recipe item based on common context information among a plurality of context information related to an eating preference of the first user and a plurality of context information related to an eating preference of a second user, obtain an additional recipe item based on different context information among the plurality of context information related to the eating preference of the first user and the plurality of context information related to the eating preference of the second user, and control the display to display an integrated customized recipe obtained based on the common recipe item and the additional recipe item.

The user may be among a plurality of users and the processor may be configured to modify the recipe by substituting an ingredient included in the selected recipe based on avoided ingredient information corresponding to each of the plurality of users, obtain a customized recipe corresponding to each of the plurality of users based on preferred ingredient information of each of the plurality of users and the modified recipe, and control the display to display the customized recipe.

The processor may be configured to obtain information regarding a cooking appliance possessed by the user and modify the at least one item included in the selected recipe based on the information regarding the cooking appliance.

The processor may be configured to modify the selected recipe by changing an item related to a first cooking appliance referenced in the selected recipe to an item related to a second cooking appliance possessed by the user in case that a type of the first cooking appliance referenced in the selected recipe and a type of the second cooking appliance are different.

The processor may be configured to control the display to display a UI that sequentially provides question information related to the plurality of context information, and obtain the plurality of context information based on answer information in response to the question information being sequentially input through the UI.

The processor may be configured to modify the at least one item included in the selected recipe by changing at least one of ingredient information, amount information, cooking appliance information, or cooking order information included in the selected recipe based on the priorities assigned to the plurality of context information.

The plurality of context information may include at least one of preferred ingredient information, avoided ingredient information, calorie information, cooking time information, possessed ingredient information, or family composition information.

A control method for an electronic apparatus includes assigning priorities to a plurality of context information received in relation to an eating preference of a user, respectively, and storing the plurality of context information assigned with the priorities in a memory, modifying, based on a recipe being selected, at least one item included in the selected recipe based on the priorities assigned to the plurality of context information and displaying a user-customized recipe including the modified item.

In the modifying of the at least one item, at least one item included in the selected recipe may be preferentially modified based on first context information related to the at least one item in case that a priority of the first context information is higher than a priority of second context information related to another item.

The user is a first user, the user-customized recipe is a first customized recipe and the modifying of the at least one item may includes: obtaining the first customized recipe for the first user based on a plurality of context information related to an eating preference of the first user and obtaining a second customized recipe for a second user based on a plurality of context information related to an eating preference of the second user; and obtaining an integrated customized recipe including an item having a degree of similarity that is equal to or higher than a threshold based on a degree of similarity between items included in the first customized recipe for the first user and the second customized recipe for the second user.

The displaying of the user-customized recipe may include: displaying the first customized recipe for the first user and the second customized recipe for the second user; and displaying a guide UI for integrating the first customized recipe for the first user and the second customized recipe for the second user.

The user may be a first user, and the modifying of the at least one item may include: obtaining a common recipe item based on common context information among a plurality of context information related to an eating preference of the first user and a plurality of context information related to an eating preference of a second user; and obtaining an additional recipe item based on different context information among the plurality of context information related to the eating preference of the first user and the plurality of context information related to the eating preference of the second user, and in the displaying of the user-customized recipe, an integrated customized recipe obtained based on the common recipe item and the additional recipe item may be displayed.

The user may be among a plurality of users and the modifying of the at least one item may include: modifying the recipe by substituting an ingredient included in the selected recipe based on avoided ingredient information corresponding to each of the plurality of users; and obtaining a respective customized recipe corresponding to each of the plurality of users based on preferred ingredient information of each of the plurality of users and the modified recipe.

The control method may further include: obtaining information regarding a cooking appliance possessed by the user; and modifying the at least one item included in the selected recipe based on the information regarding the cooking appliance, and in the modifying of the at least one item, in case that the type of a first cooking appliance referenced in the selected recipe and the type of a second cooking appliance possessed by the user are different, the selected recipe may be modified by changing an item related to the first cooking appliance referenced in the selected recipe to an item related to the second cooking appliance.

In the modifying of the at least one item, at least one item included in the selected recipe may be modified by changing at least one of ingredient information, amount information, cooking appliance information, or cooking order information included in the selected recipe based on the priorities of the plurality of context information.

A non-transitory computer-readable medium storing a computer command to be executed by a processor of an electronic apparatus to cause the electronic apparatus to perform operations including assigning priorities to a plurality of context information received in relation an eating preference of a user, respectively, and storing the plurality of context information with the assigned priorities in a memory; modifying, based on a recipe being selected, at least one item included in the selected recipe based on the priorities assigned to the plurality of context information; and displaying a user-customized recipe including the modified item.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
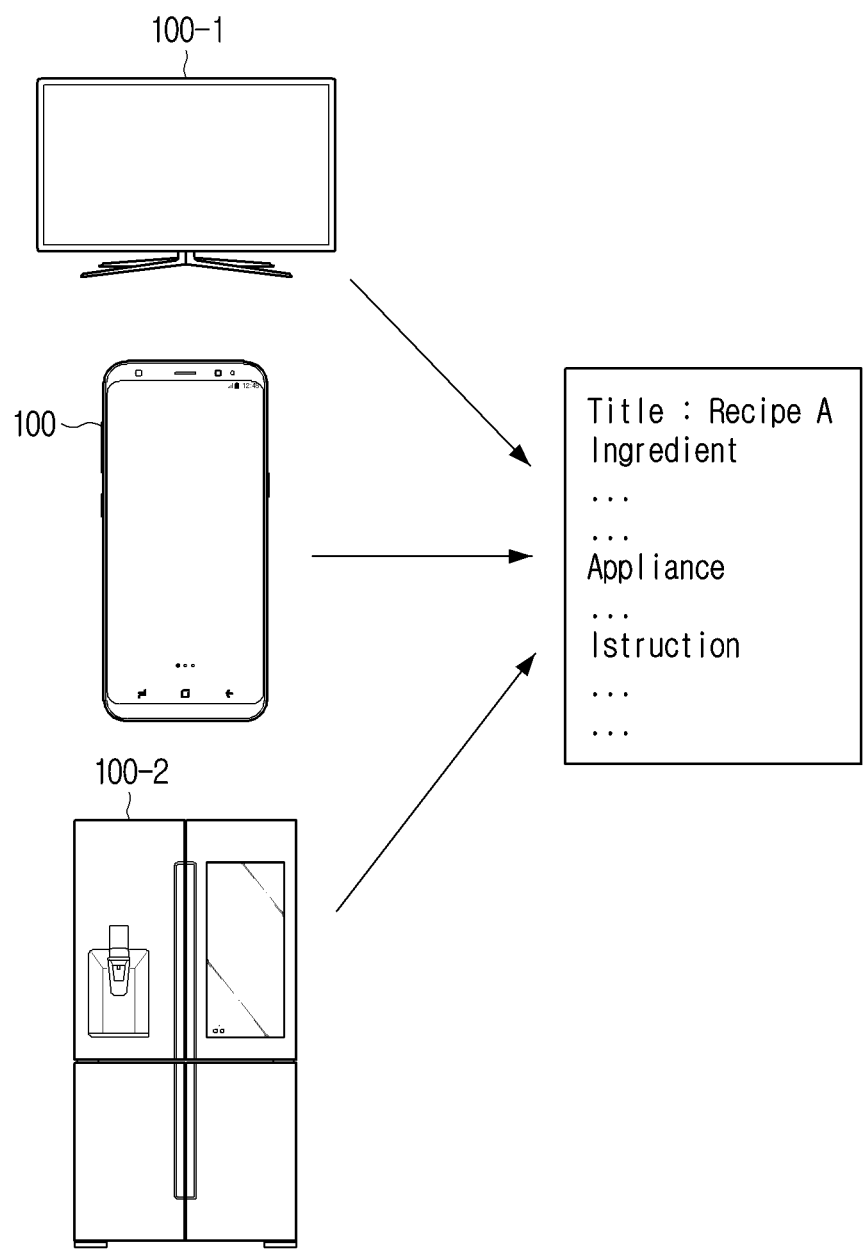
FIG. 1 is a diagram for explaining an information providing method for an electronic apparatus according to an embodiment of the disclosure.

Hereinafter, the disclosure will be described in detail with reference to the accompanying drawings.

After terms used in the specification are schematically described, the disclosure will be described in detail.

General terms that are currently widely used were selected as terms used in embodiments of the disclosure in consideration of functions in the disclosure, but may be changed depending on the intention of those skilled in the art or a judicial precedent, the emergence of a new technique, and the like. In addition, in a specific case, terms arbitrarily chosen by an applicant may exist. In this case, the meaning of such terms will be mentioned in detail in a corresponding description portion of the disclosure. Therefore, the terms used in embodiments of the disclosure are to be defined on the basis of the meaning of the terms and the contents throughout the disclosure rather than simple names of the terms.

In the specification, an expression "have", "may have", "include", "may include", or the like, indicates existence of a corresponding feature (for example, a numerical value, a function, an operation, a component such as a part, or the like), and does not exclude existence of an additional feature.

An expression "at least one of A and/or B" is to be understood to represent "A" or "B" or "any one of A and B".

Expressions "first", "second", or the like, used in the specification may indicate various components regardless of a sequence and/or importance of the components, will be used only to distinguish one component from the other components, and do not limit the corresponding components.

In case that it is mentioned that any component (for example, a first component) is (operatively or communicatively) coupled with/to or is connected to another component (for example, a second component), it is to be understood that any component is directly coupled to another component or may be coupled to another component through the other component (for example, a third component).

Singular forms are intended to include plural forms unless the context clearly indicates otherwise. It should be understood that terms "include" or "formed of" used in the specification specify the presence of features, numerals, steps, operations, components, parts, or combinations thereof mentioned in the specification, but do not preclude the presence or addition of one or more other features, numerals, steps, operations, components, parts, or combinations thereof.

In the disclosure, a "module" or a "-er/or" may perform at least one function or operation, and be implemented as hardware or software or be implemented as a combination of hardware and software. In addition, a plurality of "modules" or a plurality of "-ers/-ors" may be integrated in at least one module and be implemented as at least one processor (not illustrated) except for a "module" or a "-er/or" that needs to be implemented as specific hardware.

An object of the disclosure is to provide an electronic apparatus that provides user-customized recipe information by applying priorities to a plurality of context information related to an eating preference of a user, and a control method therefor.

According to various embodiments described above, user convenience is improved because a user-customized recipe modified by reflecting a priority of context information of a user is provided.

Hereinafter, an embodiment of the disclosure will be described in detail with reference to the accompanying drawings.

FIG. 1 is a diagram for explaining an information providing method for an electronic apparatus according to an embodiment of the disclosure.

Referring to FIG. 1, various types of electronic apparatuses 100, 100-1, and 100-2 may provide recipe information obtained through various routes.

Here, as an example, the electronic apparatuses 100, 100-1, and 100-2 may be smart phones, tablet PCs, smart TVs, mobile phones, personal digital assistants (PDAs), laptops, media players, e-book readers, digital broadcasting terminals, navigation devices, MP3 players, and other mobile or non-mobile computing devices, but are not limited thereto. As another example, the electronic apparatuses 100, 100-1, and 100-2 may be home appliances including a display, such as a refrigerator. In addition, the electronic apparatuses 100, 100-1, and 100-2 may be wearable terminals such as watches, glasses, hair bands, and rings having a communication function and a data processing function. In addition, the electronic apparatus 100 includes a built-in touch screen and may thus be implemented in such a way that a program may be executed by using a finger or a pen (for example, a stylus pen).

According to an embodiment, in case that a recipe is found on the Internet, the found recipe may be provided through the display provided in the electronic apparatuses 100, 100-1, and 100-2.

However, according to an embodiment of the disclosure, a user-customized recipe modified based on context information of a user may be provided instead of simply providing a found recipe. Hereinafter, various methods of providing a user-customized recipe according to various embodiments of the disclosure will be described.

Figure 2:
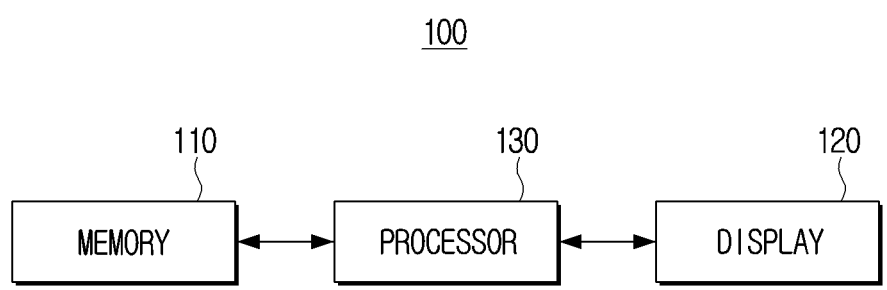
FIG. 2 is a block diagram illustrating a configuration of the electronic apparatus according to an embodiment of the disclosure.

FIG. 2 is a block diagram illustrating a configuration of the electronic apparatus according to an embodiment of the disclosure.

The electronic apparatus 100 of FIG. 2 includes a memory 110, a display 120, and a processor 130.

The memory 110 may store data required for various embodiments of the disclosure. The memory 110 may be implemented in a form of a memory embedded in the electronic apparatus 100 or be implemented in a form of a memory attachable to and detachable from the electronic apparatus 100, depending on a data storing purpose. For example, data for driving the electronic apparatus 100 may be stored in the memory embedded in the electronic apparatus 100, and data for an extension function of the electronic apparatus 100 may be stored in the memory attachable to and detachable from the electronic apparatus 100. Meanwhile, in case that the memory 110 is the memory embedded in the electronic apparatus 100, the memory 110 may be implemented by at least one of a volatile memory (for example, a dynamic random access memory (DRAM), a static RAM (SRAM), a synchronous dynamic RAM (SDRAM), or the like) or a non-volatile memory (for example, a one time programmable read only memory (OTPROM), a programmable ROM (PROM), an erasable and programmable ROM (EPROM), an electrically erasable and programmable ROM (EEPROM), a mask ROM, a flash ROM, a flash memory (for example, a NAND flash, a NOR flash, or the like), a hard drive, or a solid state drive (SSD)). In case that the memory 110 is the memory attachable to and detachable from the electronic apparatus 100, the memory 110 may be implemented by a memory card (for example, a compact flash (CF), a secure digital (SD), a micro-SD, a mini-SD, an extreme digital (xD), a multi-media card (MMC), or the like), an external memory (for example, a USB memory) connectable to a USB port, or the like.

According to an embodiment, the memory 110 may store various data, programs, or applications for driving and controlling the electronic apparatus 100. The memory 110 may store control programs for controlling the electronic apparatus 100 and the processor 130, and applications initially provided from a manufacturer or downloaded from the outside, databases, and related data. For example, the memory 110 may store an application for providing a user-customized recipe according to an embodiment.

The display 120 may be implemented by a display including a self-luminous element or a display including a non-self-luminous element and a backlight. For example, the display 120 may be implemented by various types of displays such as a liquid crystal display (LCD), an organic light emitting diode (OLED) display, a light emitting diode (LED) display, a micro LED display, a mini LED display, a plasma display panel (PDP), a quantum dot (QD) display, and a quantum dot light-emitting diode (QLED) display. A driving circuit, a backlight unit, and the like, that may be implemented in the form such as an a-si thin film transistor (TFT), a low temperature poly silicon (LTPS), a TFT, an organic TFT (OTFT), and the like, may be included in the display 120. Meanwhile, the display 240 may also be implemented by a touch screen combined with a touch sensor, a flexible display, a rollable display, a three-dimensional (3D) display, a display in which a plurality of display modules are physically connected to each other, or the like.

The processor 130 is electrically connected to the memory 110 and controls an overall operation of the electronic apparatus 100. The processor 130 may include one or more processors. Specifically, the processor 130 may perform operations of the electronic apparatus 100 according to various embodiments of the disclosure by executing at least one instruction stored in the memory 110.

According to an embodiment, the processor 130 may be implemented by a digital signal processor (DSP) processing a digital video signal, a microprocessor, a graphics processing unit (GPU), an artificial intelligence (AI) processor, a neural processing unit (NPU), or a time controller (ICON). However, the processor 130 is not limited thereto, and may include one or more of a central processing unit (CPU), a micro controller unit (MCU), a micro processing unit (MPU), a controller, an application processor (AP), a communication processor (CP), and an ARM processor, or may be defined by these terms. In addition, the processor 130 may be implemented by a system-on-chip (SoC) or a large scale integration (LSI) in which a processing algorithm is embedded or may be implemented in the form of an application specific integrated circuit (ASIC) or a field programmable gate array (FPGA).

Based on receiving a plurality of context information related to an eating preference of the user, the processor 130 may assign priorities to the plurality of context information and store the plurality of context information in the memory 110. Here, the plurality of context information may include information regarding the eating preference of the user, information regarding family members of the user, and information regarding equipment and/or ingredients possessed by the user. For example, the context information may include at least one of preferred ingredient (preferred food ingredient) information, avoided ingredient information (avoided food ingredient) information, calorie information, cooking time information, possessed ingredient (possessed ingredient) information, or family composition information. Here, the calorie information may include calorie information for each ingredient, caloric restriction information of the user, and the like.

According to an example, the plurality of context information may be input through a user interface (UI) provided through the display 120. For example, the processor 130 may control the display 120 to display a UI that sequentially provides question information related to the plurality of context information. In this case, the plurality of context information may be obtained based on answer information for the question information being sequentially input through the corresponding UI. Here, the UI may be provided through various screens such as an application execution screen or a web browser screen. Here, a UI screen is a component for an interface with a user, and may include an input interface for receiving an input from the user and an output interface for displaying information according to the input from the user.

According to another example, the plurality of context information may be received from an external device or an external server (not illustrated). For example, the plurality of context information obtained by analyzing various activity data (for example, SNS photos, text messages, and purchase history receipts) of the user may be received from an external server. According to another example, the plurality of context information may be received from other applications (for example, SNS applications) capable of providing the context information of the user.

In addition, in case that the context information of each of a plurality of users is input or received, the corresponding context information may be mapped for each user and stored in the memory 110.

Meanwhile, a priority of each of the plurality of contexts may be set according to a user input or may be assigned by the processor 130 according to a predetermined order. For example, the processor 130 may assign the highest priority to the avoided ingredient information and assign the lowest priority to the cooking time information according to the predetermined order.

Although it has been described in the embodiment described above that the plurality of context information are stored in the memory 110 inside the electronic apparatus 100, according to another embodiment, the corresponding information may be stored in an external server (not illustrated) and received in real time.

According to an embodiment, based on a recipe being selected, the processor 130 may modify at least one item included in the selected recipe based on the priorities of the plurality of context information and control the display 120 to display a user-customized recipe including the modified item. According to an example, the processor 130 may provide a user-customized recipe through an application, which is software that the user directly uses on an operating system (OS). In this case, the application may be provided in the form of an icon interface on the screen of the display 120. However, the disclosure is not limited thereto, and the application may be provided through various screens such as a web browser screen.

The processor 130 may modify at least one item included in the selected recipe by changing at least one of ingredient information, amount information, cooking appliance information, or cooking order information included in the selected recipe based on the priorities of the plurality of context information.

According to an embodiment, in case that a priority of first context information related to a specific item in the selected recipe is higher than a priority of second context information related to the specific item, the processor 130 may preferentially modify the specific item based on the first context information. For example, the plurality of context information related to an ingredient item, for example, the avoided ingredient information and the preferred ingredient information, are assumed. In this case, in case that the priority of the avoided ingredient information is higher than that of the preferred ingredient information, the processor 130 may preferentially modify the ingredient item based on the avoided ingredient information.

Next, in case that there is no problem in applying the second context information after applying the first context information, the processor 130 may additionally modify the corresponding specific item based on the second context information. However, in case that the processor 130 is not able to apply both the first context information and the second context information, the second context information having the lower priority may not be reflected in modifying the recipe.

According to another embodiment, the processor 130 may obtain a customized recipe corresponding to each of a plurality of users, and obtain an integrated customized recipe based on the obtained customized recipes. For example, the plurality of users may be dining members.

For example, the processor 130 may obtain a customized recipe of a first user based on a plurality of context information related to an eating preference of the first user and obtain a customized recipe of a second user based on a plurality of context information related to an eating preference of the second user. Subsequently, the processor 130 may control the display 120 to display an integrated customized recipe obtained by combining the customized recipe for the first user and the customized recipe for the second user.

For example, the processor 130 may obtain the integrated customized recipe including an item whose degree of similarity is equal to or higher than a threshold based on a degree of similarity between items included in the customized recipe for the first user and the customized recipe for the second user.

Alternatively, the processor 130 may obtain the integrated customized recipe by combining at least some of the customized recipe for the first user or the customized recipe for the second user based on priorities of the first and second users related to a specific item. Alternatively, the processor 130 may select one of the customized recipe for the first user and the customized recipe for the second user as the integrated customized recipe based on the priorities of the first and second users.

For example, the processor 130 may display the customized recipe for the first user and the customized recipe for the second user, and display a guide UI for integrating the customized recipe for the first user and the customized recipe for the second user. In this case, the guide UI may include various menu items such as a menu for selecting one of the customized recipe for the first user and the customized recipe for the second user, a menu for modifying some of the items included in the customized recipe for the first user or the customized recipe for the second user, and a menu for giving a weight to some items included in the customized recipe for the first user or the customized recipe for the second user.

As another example, the processor 130 may obtain a common recipe item based on common context information among the plurality of context information related to the eating preference of the first user and the plurality of context information related to the eating preference of the second user, and may obtain an additional recipe item based on different context information among the context information of the first user and the context information of the second user. Subsequently, the processor 130 may control the display 120 to display an integrated customized recipe obtained based on the common recipe item and the additional recipe item.

For example, the processor 130 may obtain the common recipe item based on the preferred ingredient information or avoided ingredient information common to the first and second users, and may obtain the additional recipe item based on the preferred ingredient information or avoided ingredient information different between the context information of the first user and the context information of the second user. For example, it is assumed that a member 1 of the family members avoids spicy, salty, and zesty tastes due to gastritis and prefers non-spicy tastes, while members 2 and 3 prefer spicy tastes. In this case, the processor 130 may generate a common recipe by adjusting a spicy ingredient for the member 1 and generate an additional recipe by adjusting the spicy ingredient for the members 2 and 3. In this case, the user may cook three servings according to the recipe for the member 1 and then take one serving for the member 1. Thereafter, the user may add the spicy ingredient to cook according to the customized recipe for the members 2 and 3.

As another example, the processor 130 may modify the recipe by substituting an ingredient included in the selected recipe based on the information regarding the avoided ingredient of each of the first and second users and obtain a customized recipe corresponding to each of the plurality of users based on the preferred ingredient information of each of the first and second users and the modified recipe.

For example, it is assumed that the ingredients included in the selected recipe (a recipe of a pasta with cream sauce) are milk, eggs, pasta noodles, and bacon, the dining members are the member 1 and the member 2, the member 1 is allergic to milk and prefers shrimp, and the member 2 is allergic to wheat and prefers pork. In this case, the processor 130 may modify the recipe by replacing milk and pasta noodles with soy milk and tofu noodles and select the modified recipe as the common recipe. In addition, the processor 130 may generate an additional recipe 1 for the member 1 by replacing bacon included in the selected recipe with shrimp, which is a preferred ingredient of the member 1 and generate an additional recipe 2 for the member 1 by leaving bacon for the member 2. In this case, the user may cook two servings based on the common recipe and add shrimp to one of the two servings cooked based on the additional recipe 1 to complete a dish for the member 1, and then, the user may add bacon to the remaining one of the two servings cooked based on the additional recipe 1 to complete a dish for the member 2.

According to an embodiment, the processor 130 may obtain information regarding a cooking appliance possessed by the user and modify at least one item included in the selected recipe based on the information regarding the cooking appliance. For example, in case that the type of a first cooking appliance included in the selected recipe and the type of a second cooking appliance possessed by the user are different, the processor 130 may modify the selected recipe by changing an item related to the first cooking appliance included in the selected recipe to an item related to the second cooking appliance.

For example, in case that the cooking appliance included in the selected recipe is an oven and the cooking appliance possessed by the user is an air fryer, the oven corresponding to an appliance item in the selected recipe may be changed to the air fryer, and at least one of a cooking temperature, a cooking mode, or a cooking time may be correspondingly changed. In this case, a lookup table in which various items related to a change of a cooking method such as a temperature, cooking mode, cooking time, or the like for each cooking appliance are mapped may be stored in the memory 110, or the corresponding lookup table may be received in real time from an external server. Alternatively, a predetermined mathematical formula for change may be used.

Figure 3:
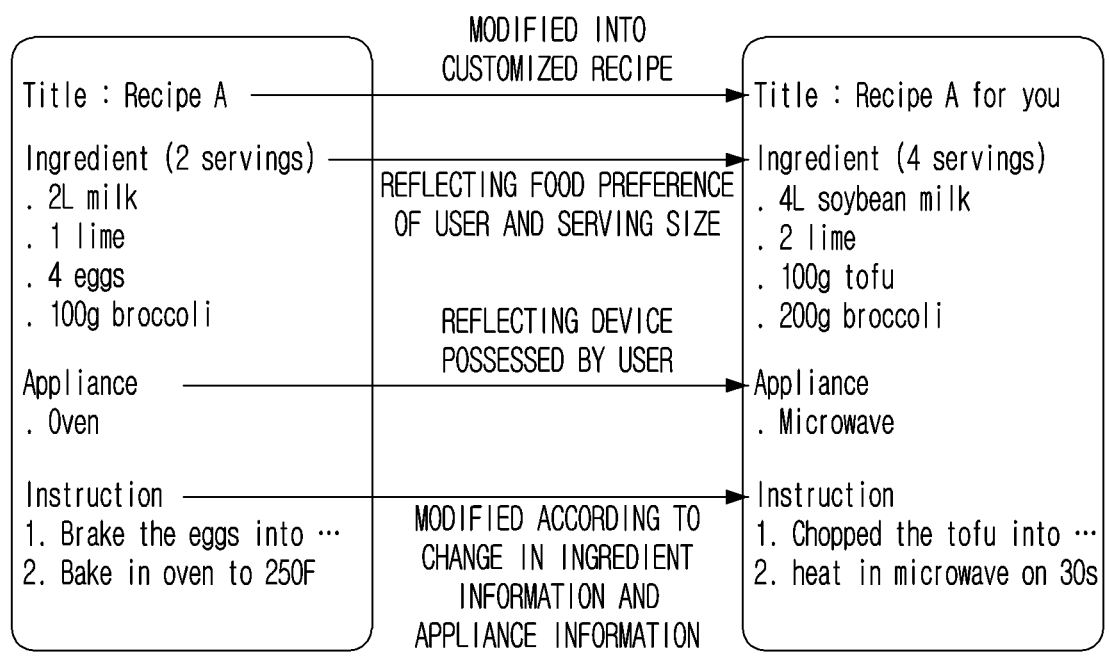
FIG. 3 is a diagram for explaining an example of a user-customized recipe according to an embodiment of the disclosure.

FIG. 3 is a diagram for explaining an example of the user-customized recipe according to an embodiment of the disclosure.

Referring to FIG. 3, the processor 130 may obtain a user-customized recipe as illustrated on the right by applying context information of a user to a recipe selected by the user as illustrated on the left. For example, the processor 130 may modify an ingredient item by reflecting food preference information and serving size information of the user, modify an appliance item by reflecting information of a cooking appliance possessed by the user, modify an instruction item by reflecting the modified ingredient item and appliance item, and obtain a user-customized recipe including the modified items.

Figure 4:
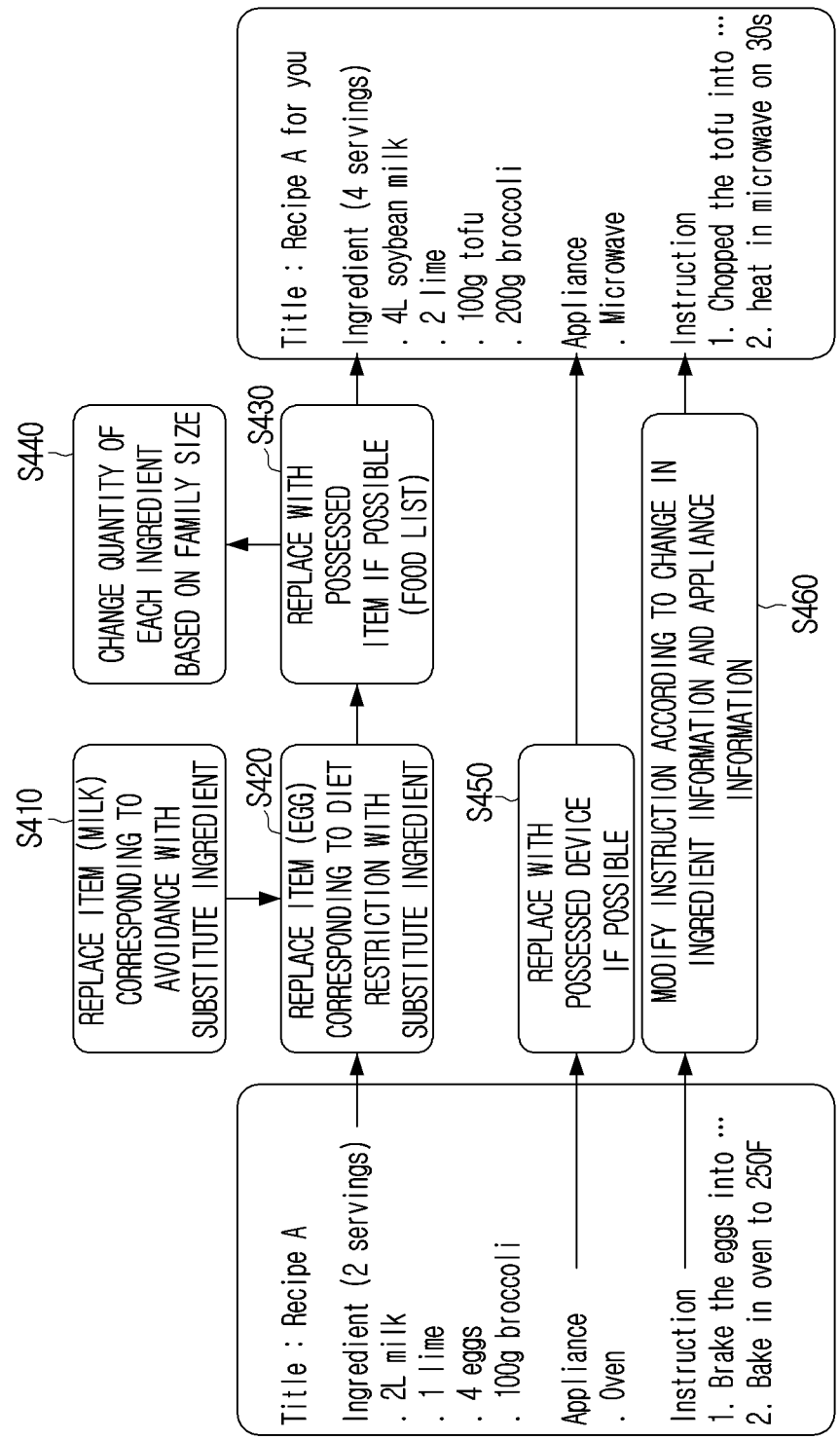
FIG. 4 is a diagram for explaining a method of obtaining the user-customized recipe by reflecting priorities of a plurality of contexts according to an embodiment of the disclosure.

FIG. 4 is a diagram for explaining a method of obtaining the user-customized recipe by reflecting priorities of a plurality of contexts according to an embodiment of the disclosure.

It is assumed that the plurality of context information corresponding to the user are prioritized in such a way that Avoidance>Diet Restriction>Food List (possessed ingredients)>Family Size.

Referring to FIG. 4, the processor 130 may replace milk, which is an item corresponding to Avoidance having the highest priority, with soybean milk (S410), and may then replace eggs corresponding to Diet Restriction having the second highest priority with tofu (S420). Then, the processor 130 may replace 1 lime, which is an item not possessed by the user, with 5 teaspoons (ts) of lime juice by referring to Food List having the third highest priority (S430). Subsequently, the processor 130 may change the quantity of each ingredient based on Family Size having the fourth highest priority (S440).

Then, the processor 130 may replace an oven corresponding to the appliance item with a microwave based on the possessed appliance information (S450).

Next, the processor 130 may modify the instruction item by reflecting the modified ingredient item and appliance item (S460), and obtain a user-customized recipe including the modified items.

Figure 5:
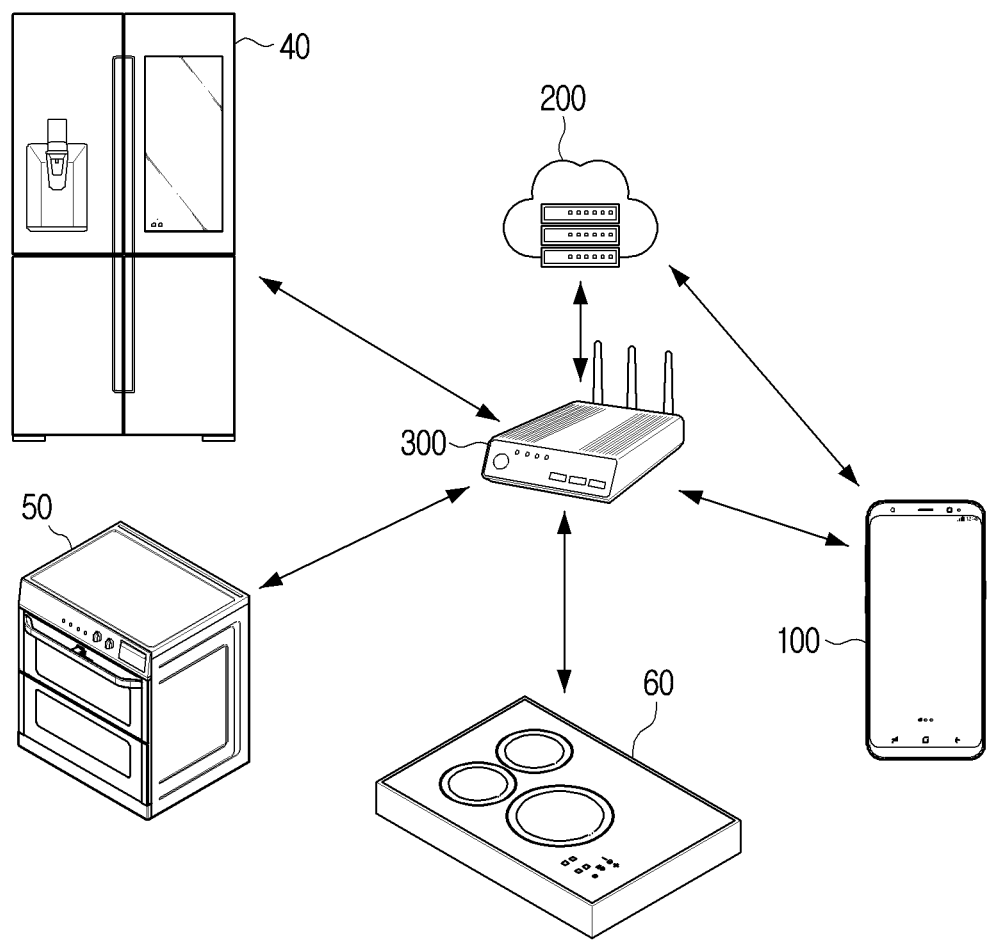
FIG. 5 is a diagram for explaining a method of managing an appliance possessed by a user according to an embodiment of the disclosure.

FIG. 5 is a diagram for explaining a method of managing an appliance possessed by the user according to an embodiment of the disclosure.

Appliances 40, 50, and 60 possessed by the user may be various Internet of Things (IoT) appliances controllable through an application installed in the electronic apparatus 100.

A server 200 may control and manage various appliances (for example, home appliances and Internet of Things (IoT) appliances) registered in the server 200. At this time, the server 200 may register the appliance for each user account. Here, the server 200 may be implemented by a cloud server, but is not limited thereto.

The electronic apparatus 100 may download and install an application from a server (not illustrated) providing the application. In this case, the user may execute the application on the electronic apparatus 100 and input a user account to log in to the server 200 through the input user account, and the electronic apparatus 100 may communication with the server 200 based on the logged-in user account.

The electronic apparatus 100 may communicate with a home appliance operating in an access point (AP) mode and transmit information regarding an access point 300 (that is, a Wi-Fi access point) to the appliances 40, 50, and 60 possessed by the user. For example, the electronic apparatus 100 may display a list of connectable access points on the display of the electronic apparatus 100 and transmit information regarding the access point 300 selected according to a user command on the list to the appliances 40, 50, and 60 possessed by the user.

Meanwhile, the appliances 40, 50, and 60 possessed by the user may establish communication connection with the access point 300 by using the information regarding the access point 300 received from the electronic apparatus 100 and access the server 200 through the access point 300. Accordingly, once the appliances 40, 50, and 60 possessed by the user access the server 200 through the access point 300, the server 200 may register the appliances 40, 50, and 60 possessed by the user in the logged-in user account.

Meanwhile, once the appliances 40, 50, and 60 possessed by the user are registered in the user account, the server 200 may transmit data received from the possessed appliances 40, 50, and 60 to the electronic apparatus 100 that communicates with the server 200 based on the user account. In addition, once a control command for the appliances 40, 50, and 60 possessed by the user is received from the electronic apparatus 100, the server 200 may transmit the received control command to the possessed appliances 40, 50, and 60. In this case, the electronic apparatus 100 implemented by a smartphone, tablet, or the like may access the server 200 through the access point 300 or a mobile communication network such as LTE or 5G, and transmit the control command for the appliances 40, 50, and 60 possessed by the user to the server 200 through the application installed in the electronic apparatus 100.

Figure 6A:
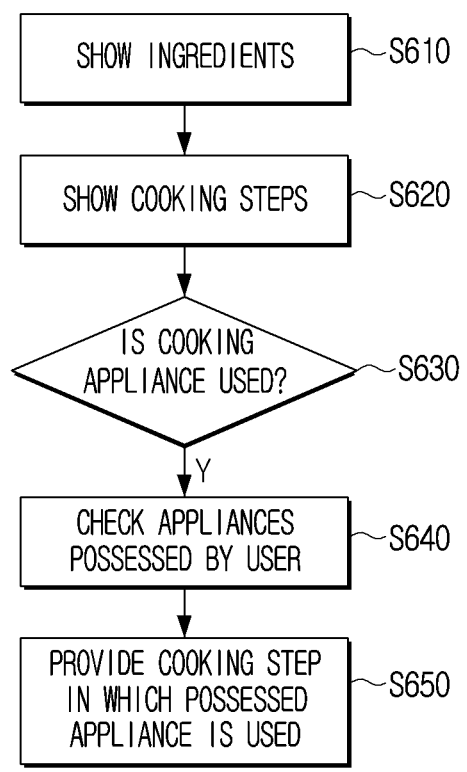
FIGS. 6A and 6B are diagrams for explaining a method of modifying a recipe based on possessed appliance information according to an embodiment of the disclosure.
Figure 6B:
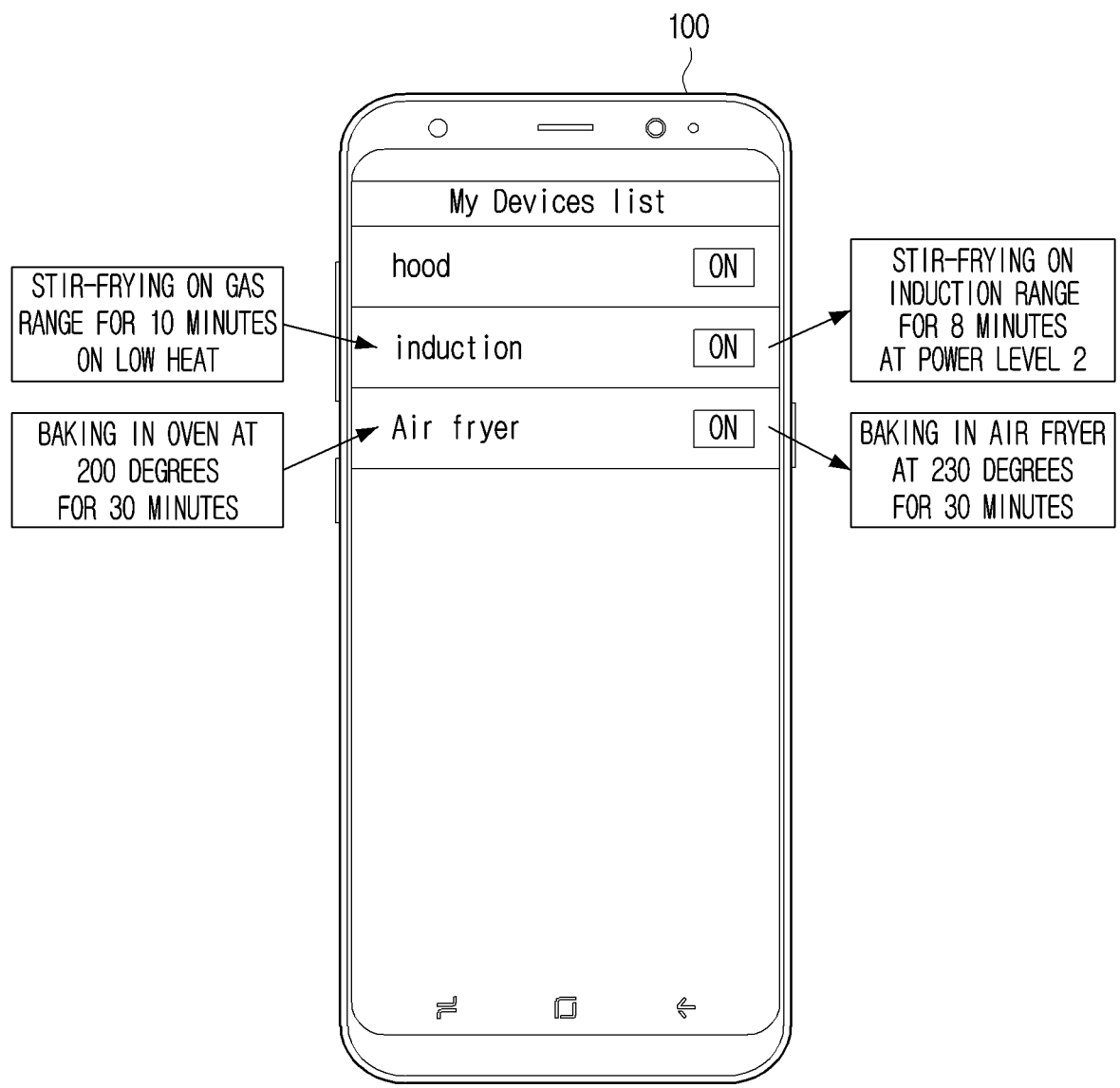

FIGS. 6a and 6b are diagrams for explaining a method of modifying a recipe based on possessed appliance information according to an embodiment of the disclosure.

In FIG. 6a, it is assumed that recipe modification is performed based on information regarding an appliance possessed by the user in an original recipe. For example, the information regarding an appliance possessed by the user may be obtained based on a system of FIG. 5. In case that the user-customized recipe according to an example of the disclosure is provided through an application, the application may be implemented by the application illustrated in FIG. 5 or a different application.

According to an example, the processor 130 may check whether or not a cooking appliance is used in a cooking step based on showing of ingredients and showing of cooking steps (S610 and S620) included in the original recipe (S630). In case of using the cooking appliance in the original recipe (S630: Y), appliances possessed by the user may be checked (S640), and the cooking step may be modified (S650). For example, it is assumed that ingredients included in the original recipe are soft flour, sugar, baking powder, and butter, and the cooking steps include kneading, resting in a refrigerator for one hour, and baking in a hot blast oven at 190 degrees for 20 minutes.

Since a cooking appliance is used, the processor 130 may check whether or not a hot blast oven is included in the appliances possessed by the user. In case that the information regarding the appliance possessed by the user includes only a toaster and an air fryer, but does not include a hot blast oven, the processor 130 may change the corresponding cooking step based on the appliances possessed by the user to "baking in a toaster at 200 degrees for 20 minutes" or/and "baking in an air fryer at 210 degrees for 20 minutes". As described above, in case that there are a plurality of items capable of replacing a specific target item, the processor 130 may select one item according to a predetermined priority among the plurality of items or provide a guide UI for selecting one of the plurality of items. For example, in case that priorities are set for the appliances possessed by the user, the processor 130 may change the target item to an item corresponding to an appliance (for example, an air fryer) having a relatively higher priority.

According to an example, in case that the processor 130 replace "baking in a hot blast oven at 190 degrees for 20 minutes" included in the original recipe with an item corresponding to an air fryer possessed by the user, a temperature and time corresponding to the air fryer may be obtained using a pre-stored change table or mathematical formula for change. For example, the processor 130 may store a lookup table in which various items related to a change of a cooking method such as a temperature, a cooking mode, a cooking time, or the like for each cooking appliance are mapped.

According to an example, the processor 130 may receive the information regarding the cooking appliance possessed by the user from an application that manages the appliance possessed by the user. For example, the corresponding application may be an application that manages/controls an appliance connected to a home network as illustrated in FIG. 6b. For example, it is assumed that the cooking appliances connected to the home network include a range hood, an induction range, and an air fryer. In this case, the processor 130 may replace "stir-frying on a gas range for 10 minutes on low heat" included in the original recipe with "stir-frying on an induction range for 8 minutes at power level 2", and replace "baking in an oven at 200 degrees for 30 minutes" with "baking in an air fryer at 230 degrees for 30 minutes".

Figure 7:
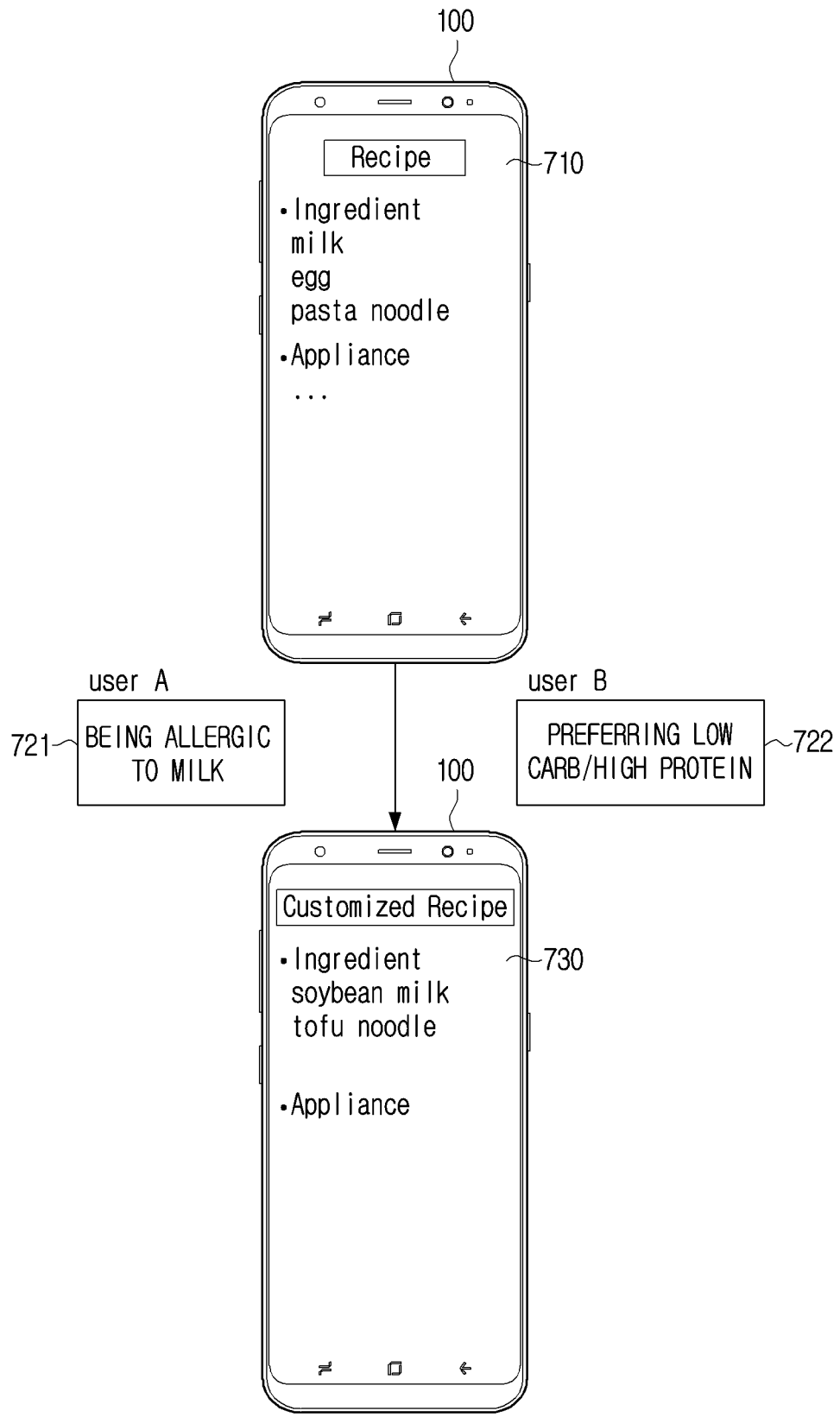
FIG. 7 is a diagram for explaining a method of generating an integrated customized recipe according to an embodiment of the disclosure.

FIG. 7 is a diagram for explaining a method of generating the integrated customized recipe according to an embodiment of the disclosure.

In the embodiment illustrated in FIG. 7, it is assumed that recipe modification is performed by reflecting context information of users A and B.

For example, it is assumed that the context information of the user A is "being allergic to milk" as the avoided ingredient information, and the context information of the user B is "preferring low carb/high protein" as the preferred ingredient information.

In this case, the processor 130 may modify the selected recipe to the user-customized recipe in such a way as to change the ingredient from milk to soybean milk by reflecting the context information of the user A and to change the ingredient from pasta noodles to tofu noodles by reflecting the context information of the user B.

However, in FIG. 7, a case where the avoided ingredient information and the preferred ingredient information of the plurality of users are reflected is described as an example for convenience of explanation, and various other context information may be reflected as well. For example, the selected recipe may be additionally modified by reflecting information such as a serving size and an appliance possessed by the user.

Figure 8A:
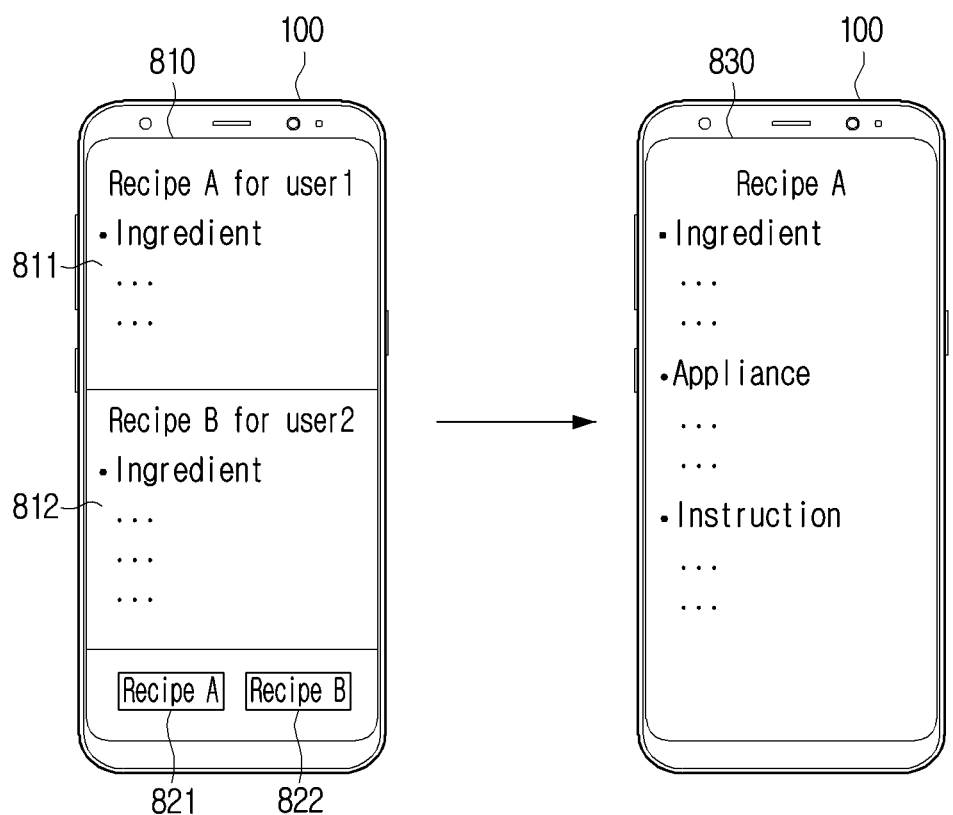
FIGS. 8A and 8B are diagrams for explaining a method of providing a user interface (UI) for generating the integrated customized recipe according to an embodiment of the disclosure.
Figure 8B:
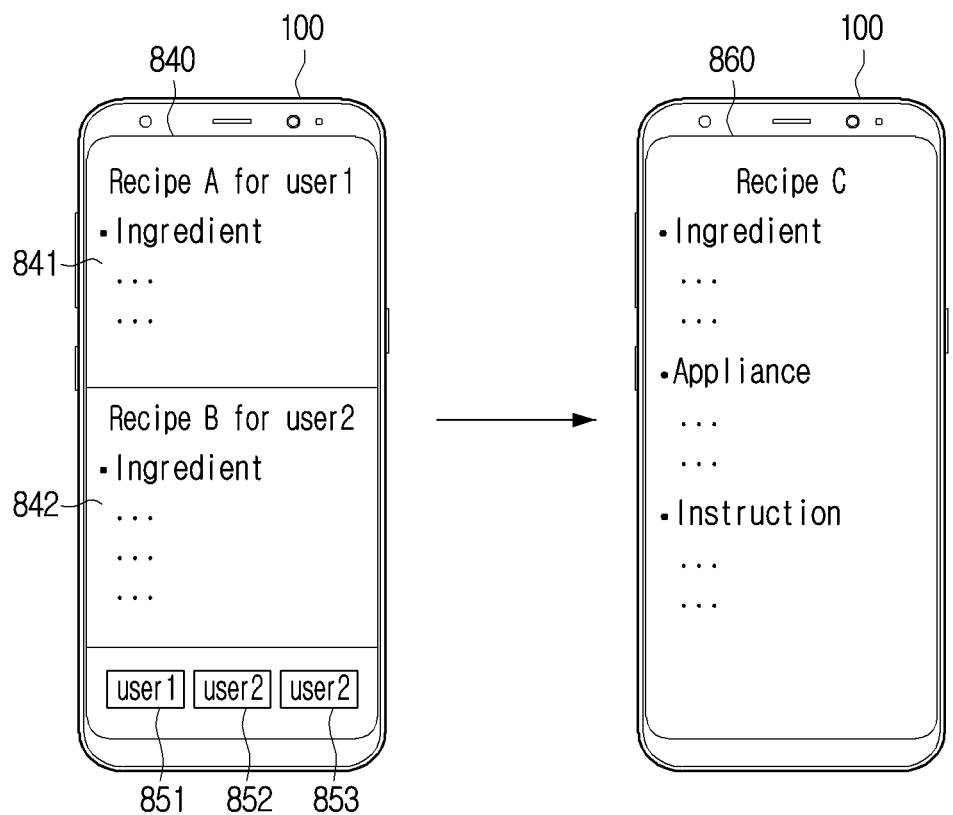

FIGS. 8a and 8b are diagrams for explaining a method of providing a UI for generating the integrated customized recipe according to an embodiment of the disclosure.

According to an embodiment, as illustrated in FIG. 8a, a UI screen 810 including recipes 811 and 812 corresponding to a plurality of users, respectively, and buttons 821 and 822 for selecting the corresponding recipes may be provided. In this case, based on a recipe A among a plurality of recipes is selected through the corresponding button 821, the selected recipe A may be provided as a user-customized recipe 830.

According to another embodiment, as illustrated in FIG. 8b, a UI screen 840 including recipes 841 and 842 corresponding to a plurality of users, respectively, and buttons 851 and 852 for selecting the corresponding recipes may be provided. In this case, based on an integrated recipe is selected through a corresponding button 853, a recipe C in which a recipe A and a recipe B are integrated may be provided as a user-customized recipe 860. Here, the integrated recipe C may be obtained through various embodiments described above.

FIGS. 9a to 9d are diagrams for explaining a method of providing a UI for receiving context information according to an embodiment of the disclosure.

According to an embodiment, the processor 130 may provide a UI that sequentially provides question information related to a plurality of context information, and obtain the plurality of context information based on answer information for the question information being sequentially input through the corresponding UI.

Figure 9A:
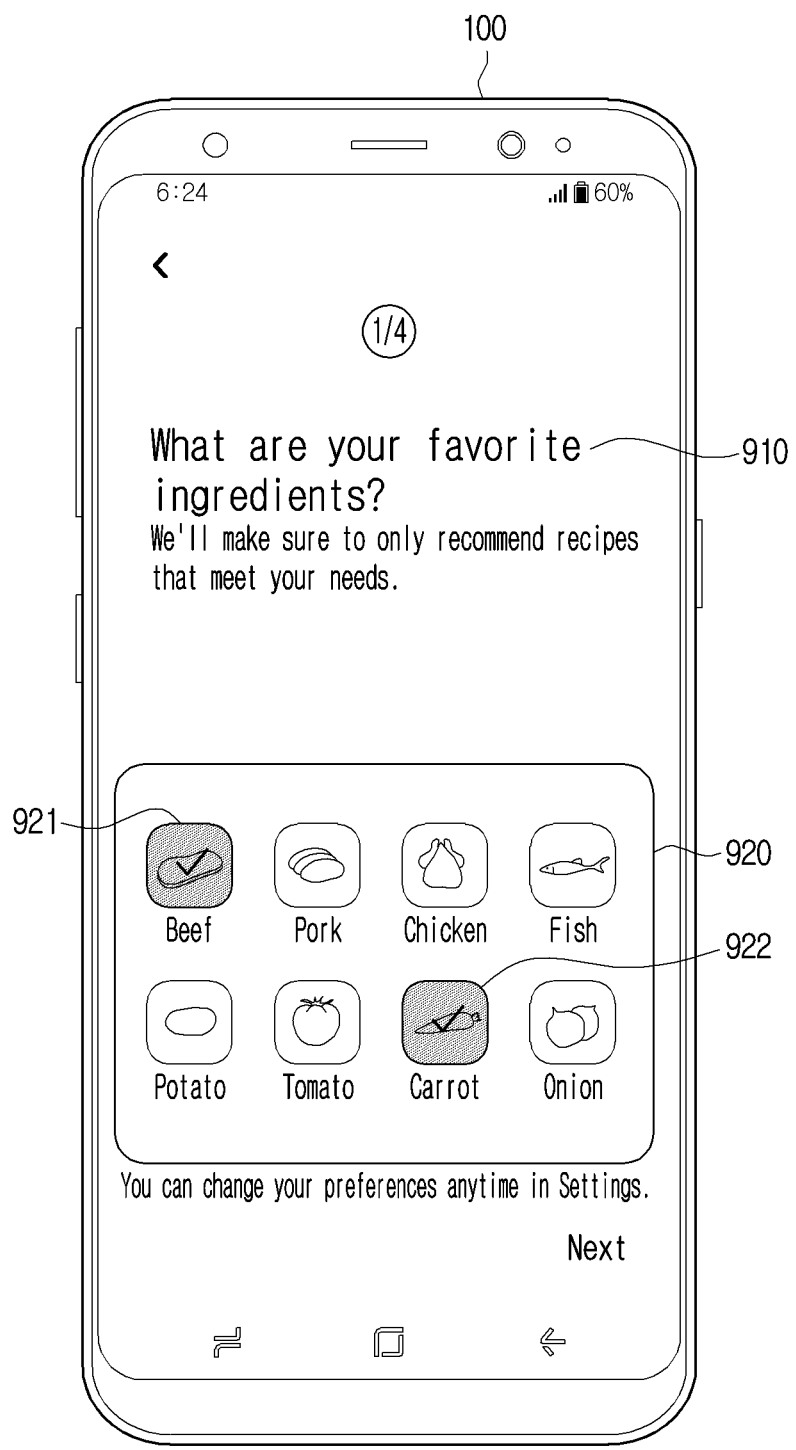
FIGS. 9A, 9B, 9C and 9D are diagrams for explaining a method of providing a UI for receiving context information according to an embodiment of the disclosure.

Referring to FIG. 9a, a UI screen provided for the first time may include a UI 910 for inquiring about preferred ingredients of the user and a UI 920 including examples of each ingredient. For example, two ingredients 921 and 922 may be selected as the preferred ingredients by the user.

Figure 9B:
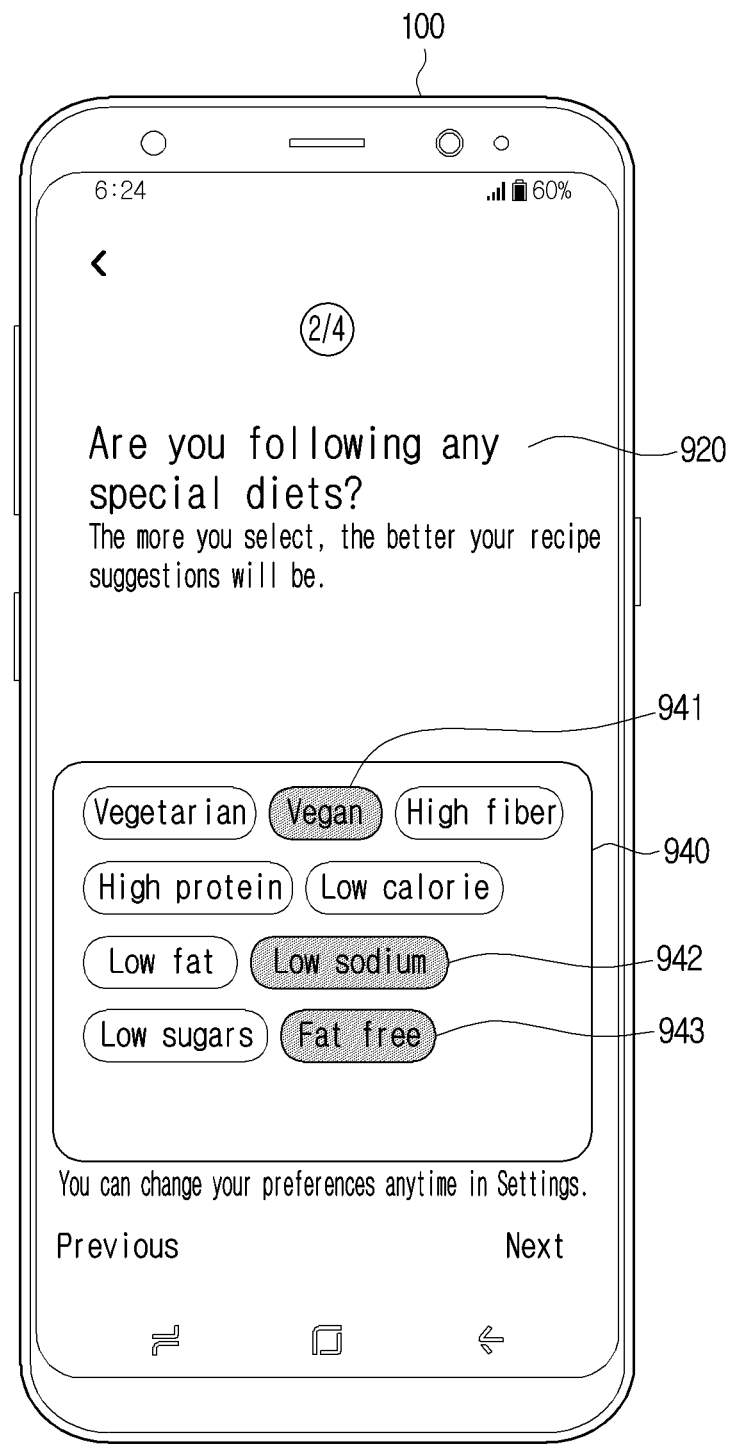

As illustrated in FIG. 9b, a UI screen provided next may include a UI 920 for inquiring about a diet type and a UI 940 including examples of each diet type. For example, three dietary types 941, 942, and 943 may be selected by the user.

Figure 9C:
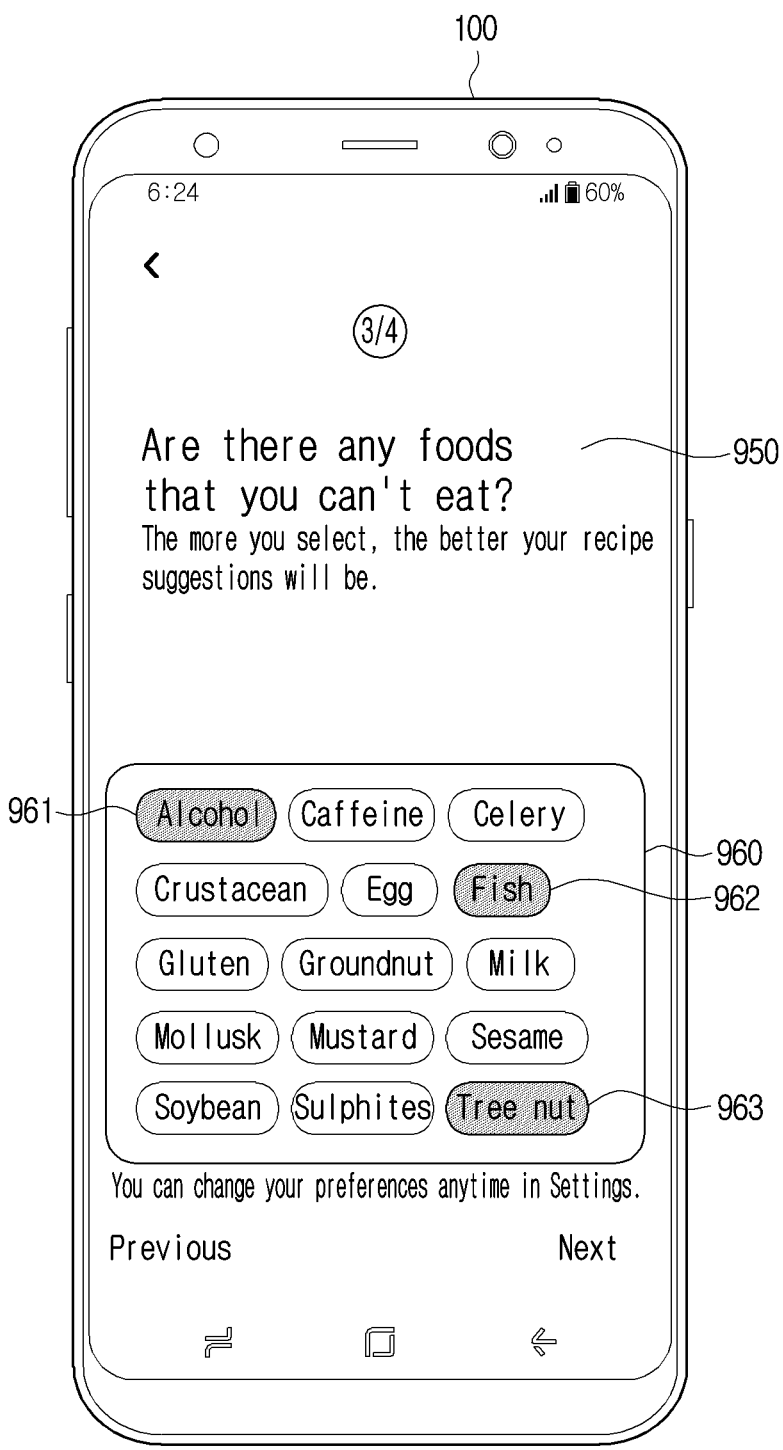

As illustrated in FIG. 9c, a UI screen provided next may include a UI 950 for inquiring about avoided ingredients and a UI 960 including examples of each avoided ingredient. For example, three ingredients 961, 962, and 963 may be selected as the avoided food ingredients by the user.

Figure 9D:
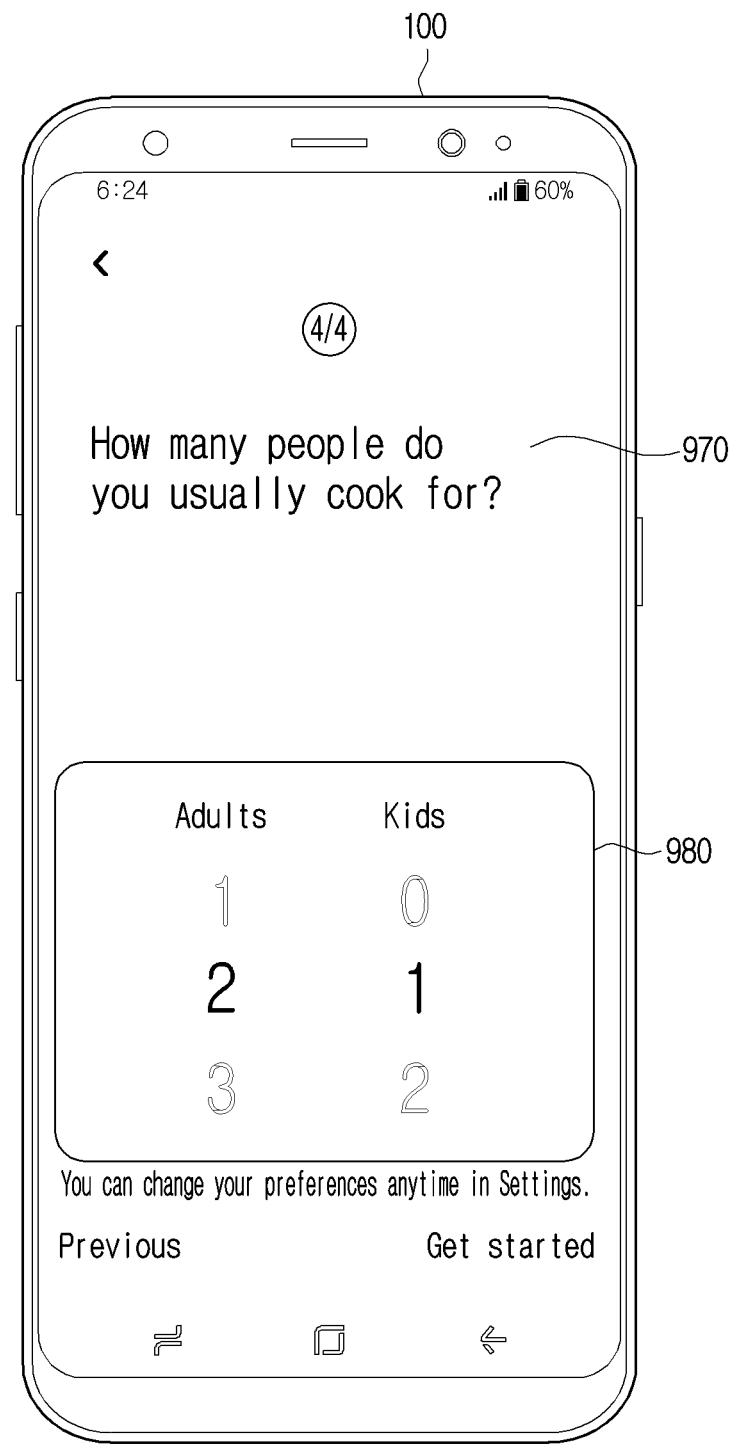

As illustrated in FIG. 9d, a UI screen provided next may include a UI 970 for inquiring about the number of dining members and a UI 980 for selecting the number for each member type. For example, the member type may include adults and kids.

Figure 10A:
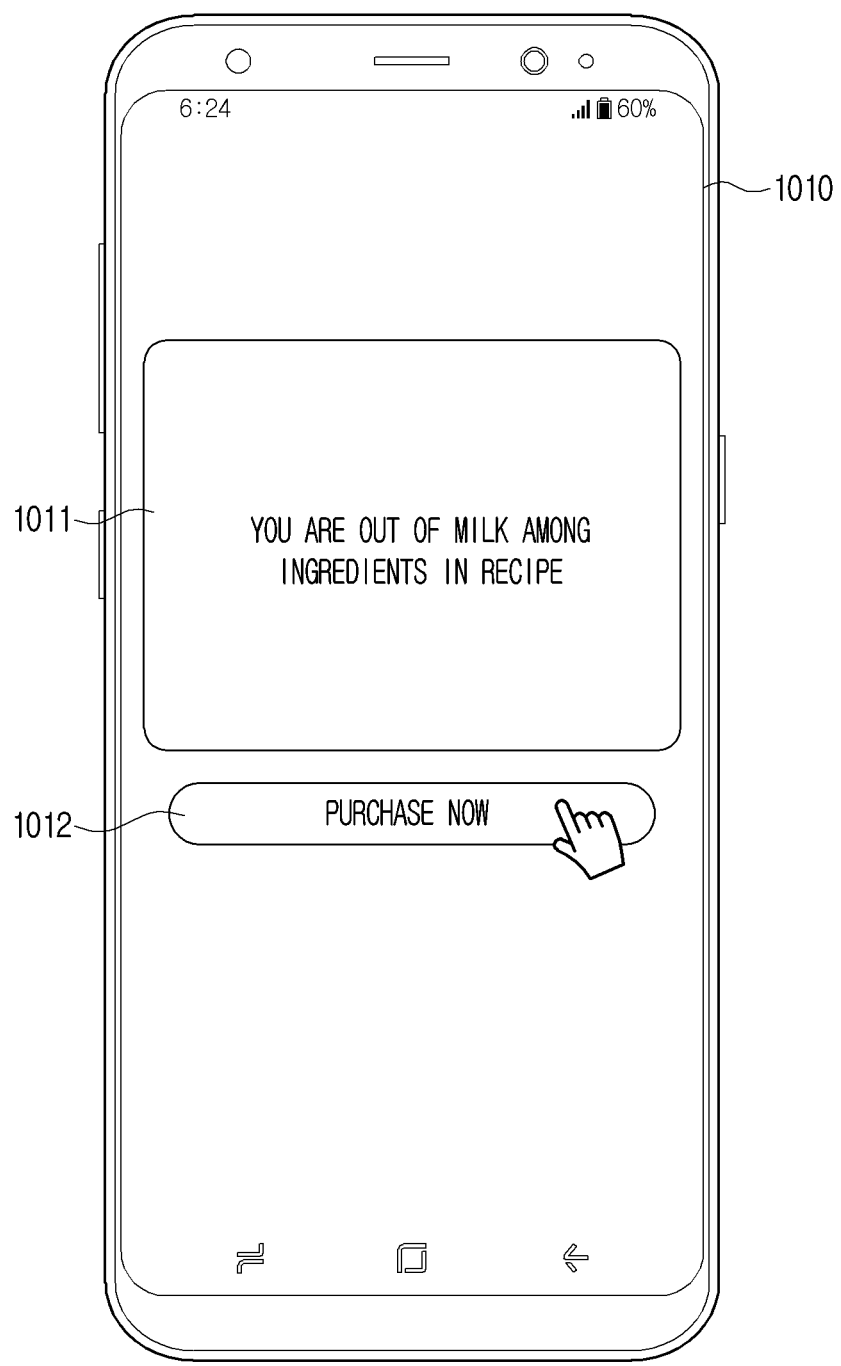
FIGS. 10A and 10B are diagrams for explaining an ingredient management method according to an embodiment of the disclosure.
Figure 10B:
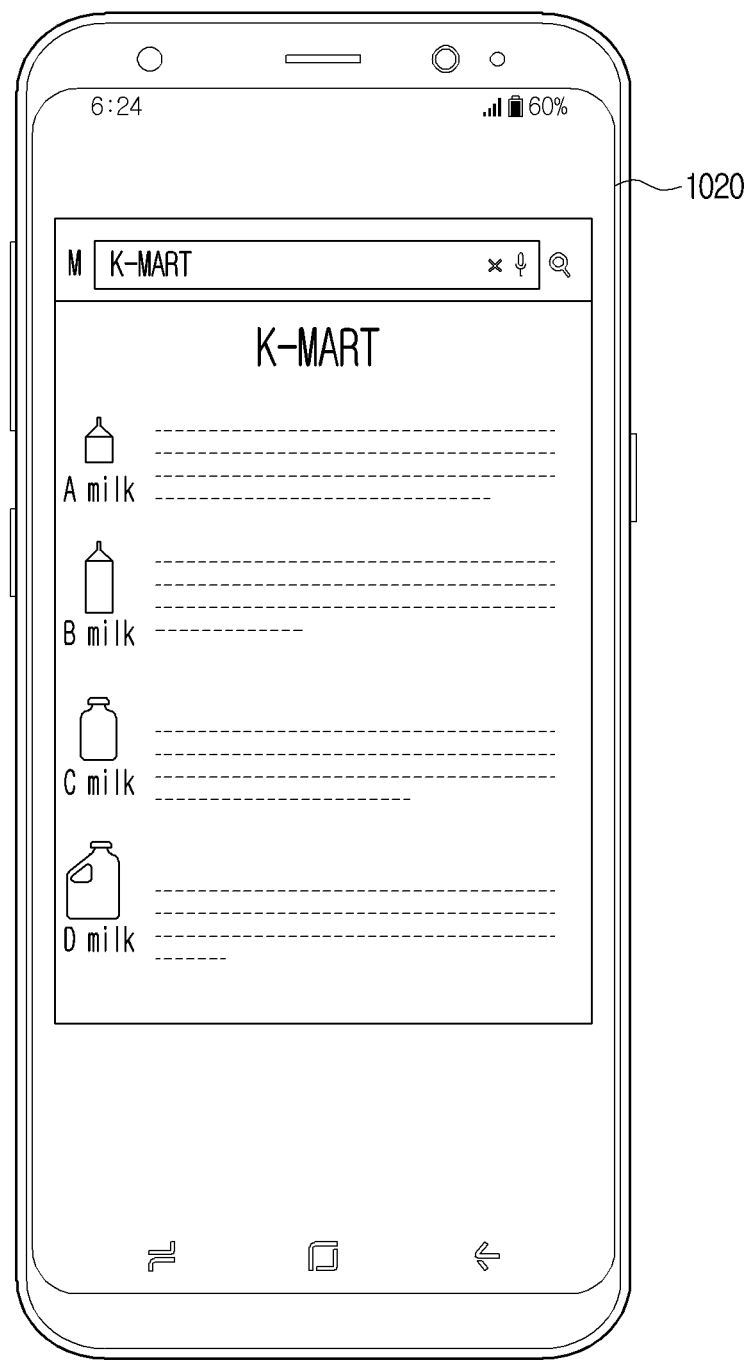

FIGS. 10a and 10b are diagrams for explaining an ingredient management method according to an embodiment of the disclosure.

According to an embodiment, the processor 130 may provide a UI screen for guiding purchase of insufficient ingredients.

As illustrated in FIG. 10a, the processor 130 may provide a UI screen 1010 including a UI 1011 for notifying of the shortage of some of ingredients required for a recipe, for example, milk, and a button 1012 for connection to a website where the corresponding ingredient may be purchased. Based on the corresponding button 1012 being selected by the user, connection to a corresponding site 1020 may be made as illustrated in FIG. 10b. For example, the processor 130 may check the amount of milk possessed by the user based on milk information received from a refrigerator 40 through the network system as illustrated in FIG. 5 and compare the amount of milk possessed by the user with the amount of milk included in the recipe to identify whether or not the amount of milk is insufficient. In addition, web site information may be set in advance by the user or may be obtained by the processor 130 obtaining information regarding a market frequently accessed by the user.

Figure 11:
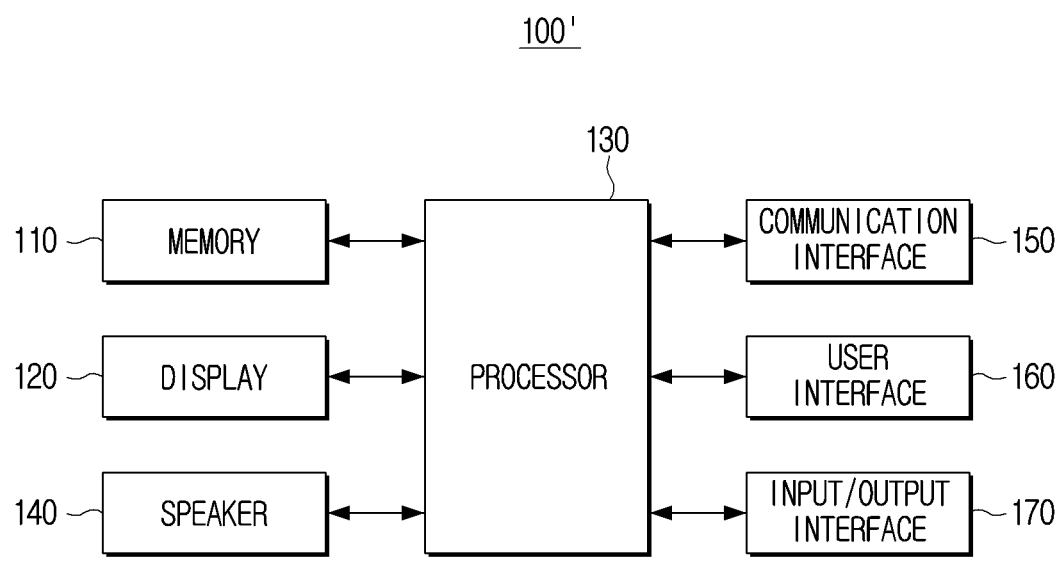
FIG. 11 is a diagram illustrating an implementation example of the electronic apparatus according to an embodiment of the disclosure.

FIG. 11 is a diagram illustrating an implementation example of the electronic apparatus according to an embodiment of the disclosure.

As illustrated in FIG. 11, an electronic apparatus 100' includes a memory 110, a display 120, a processor 130, a speaker 140, a communication interface 150, a user interface 160, an input/output interface 170, and a position sensor 180. A detailed description for components overlapping components illustrated in FIG. 2 among components illustrated in FIG. 10 will be omitted.

The memory 110 stores various modules for driving the electronic apparatus 100 therein. For example, software including a base module, a sensing module, a communication module, a presentation module, a web browser module, and a service module may be stored in the memory 110. Here, the base module is a basic module processing signals transferred from each hardware included in the electronic apparatus 100 and transferring the processed signals to an upper layer module. The sensing module, which is a module collecting information from various sensors and analyzing and managing the collected information, may include a face recognizing module, an audio recognizing module, a motion recognizing module, an NFC recognizing module, and the like. The presentation module, which is a module for configuring a display screen, may include a multimedia module for reproducing and outputting a multimedia content and a user interface (UI) rendering module performing UI and graphic processing. The communication module is a module for performing communication with the outside. The web browser module is a module performing web browsing to access a web server. The service module is a module including various applications for providing various services.

Meanwhile, the processor 130 may perform a graphic processing function (video processing function). For example, the processor 130 may render a screen including various objects such as an icon, an image, a text, and the like, using a calculator (not illustrated) and a renderer (not illustrated). Here, the calculator (not illustrated) may calculate attribute values such as coordinate values at which the respective objects will be displayed, forms, sizes, colors, and the like, of the respective objects depending on a layout of the screen on the basis of a received control command. In addition, the renderer (not illustrated) renders screens of various layouts including objects on the basis of the attribute values calculated in the calculator (not illustrated).

Meanwhile, the processor 130 may perform processing on audio data. In detail, the processor 130 may perform various kinds of processing such as decoding, amplifying, noise filtering, and the like, on the audio data.

The speaker 140 is a component outputting various notification sounds, a voice message, or the like, as well as various audio data processed by the input/output interface 170. The processor 130 may control the speaker 140 to output information corresponding to the UI screens or various notifications according to various embodiments of the disclosure in the form of audio. For example, the processor 130 may control the speaker 140 to output at least one of a selected recipe or a modified recipe in the form of a voice.

The communication interface 150 may communicate with a network device (not illustrated).

According to an embodiment, the communication interface 150 may include a wireless communication module that communicates with an AP device (FIGS. 1 and 20). For example, the communication interface 150 may include a wireless communication module, for example, a Wi-Fi module. That is, a communication network between an AP device 300 and the electronic apparatus 100 may be a Wi-Fi network, but is not limited thereto. The Wi-Fi module may perform communication according to at least one standard version of 802.11ac among 802.11a, 802.11b, 802.11g, and 802.11n, but is not limited thereto, and a new version developed later may be included.

However, the disclosure is not limited thereto, and the communication interface 150 may perform communication according to various wireless communication standards such as ZigBee, 3rd generation (3G), 3rd generation partnership project (3GPP), long term evolution (LTE), LTE Advanced (LTE-A), 4th generation (4G), and 5th generation (5G), an infrared data association (IrDA) technology, and the like, in addition to the communication manner described above.

For example, the processor 130 may control the communication interface 150 to transmit at least one of a selected recipe or a modified recipe to an external device.

The user interface 160 may be implemented as a device such as a button, a touch pad, a mouse, and a keyboard or may be implemented as a touch screen that may perform both of the abovementioned display function and manipulation input function. Here, the button may be various types of buttons such as a mechanical button, a touch pad, a wheel, and the like, formed in any region such as a front surface portion, a side surface portion, a back surface portion, and the like, of a body appearance of the electronic apparatus 100.

The input/output interface 170 may be any one of a high definition multimedia interface (HDMI), a mobile high-definition link (MHL), a universal serial bus (USB), a display port (DP), a thunderbolt, a video graphics array (VGA) port, an RGB port, a D-subminiature (D-SUB), or a digital visual interface (DVI). The input/output interface 170 may input/output at least one of an audio signal or a video signal.

The position sensor 180 may sense the position of the electronic apparatus 100. The position sensor 180 may be implemented by a global positioning system (GPS) receiver, but is not limited thereto and is applicable as long as position information of the electronic apparatus 100 may be obtained.

Meanwhile, the electronic apparatus 100' may further include a microphone (not illustrated). The microphone is a component for receiving a user speech or other sounds and converting the user speech or other sounds into audio data. For example, a user command input on the UI screens according to various embodiments of the disclosure may be input in the form of a voice command.

Figure 12:
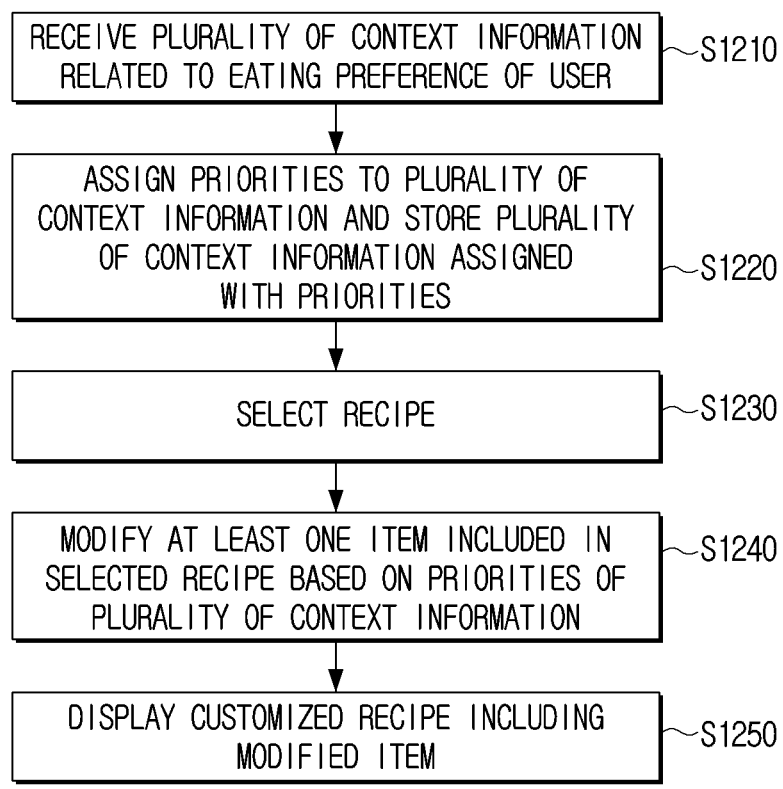
FIG. 12 is a flowchart for describing a control method for the electronic apparatus according to an embodiment of the disclosure.

FIG. 12 is a flowchart for describing a control method for the electronic apparatus according to an embodiment of the disclosure.

According to the control method for the electronic apparatus illustrated in FIG. 12, a plurality of context information related to the eating preference of the user are input (S2110), and the plurality of context information are assigned with priorities and stored (S1220). Here, the plurality of context information may include at least one of preferred ingredient information, avoided ingredient information, calorie information, cooking time information, possessed ingredient information, or family composition information.

Subsequently, a recipe is selected (S1230), and at least one item included in the selected recipe may be modified based on the priorities of the plurality of context information (S1240).

Thereafter, a user-customized recipe including the modified item may be displayed (S1250).

Here, in the modifying of the at least one item (S1240), in case that a priority of first context information related to a specific item in the selected recipe is higher than a priority of second context information related to the specific item, the specific item may be preferentially modified based on the first context information.

In addition, the modifying of the at least one item (S1240) may include: obtaining a customized recipe for a first user based on a plurality of context information related to an eating preference of the first user and obtaining a customized recipe for a second user based on a plurality of context information related to an eating preference of the second user; and obtaining an integrated customized recipe including an item whose degree of similarity is equal to or higher than a threshold based on a degree of similarity between items included in the customized recipe for the first user and the customized recipe for the second user.

In addition, the displaying of the user-customized recipe (S1250) may include: displaying the customized recipe for the first user and the customized recipe for the second user; and displaying a guide UI for integrating the customized recipe for the first user and the customized recipe for the second user.

In the modifying of the at least one item (S1240), a common recipe item may be obtained based on common context information among the plurality of context information related to the eating preference of the first user and the plurality of context information related to the eating preference of the second user, and an additional recipe item may be obtained based on different context information among the plurality of context information related to the eating preference of the first user and the plurality of context information related to the eating preference of the second user. In this case, in the displaying of the user-customized recipe (S1250), an integrated customized recipe obtained based on the common recipe item and the additional recipe item may be displayed.

In addition, in the modifying of the at least one item (S1240), the recipe may be modified by substituting an ingredient included in the selected recipe based on the avoided ingredient information corresponding to each of the plurality of users. In this case, in the displaying of the user-customized recipe (S1250), a customized recipe corresponding to each of the plurality of users may be obtained and displayed based on the preferred ingredient information and the modified recipe for each of the plurality of users.

The control method may further include: obtaining information regarding a cooking appliance possessed by the user; and modifying at least one item included in the selected recipe based on the information regarding the cooking appliance. In this case, in the modifying of the at least one item, in the modifying of the at least one item (S1240), in case that the type of a first cooking appliance included in the selected recipe and the type of a second cooking appliance possessed by the user are different, the selected recipe may be modified by changing an item related to the first cooking appliance included in the selected recipe to an item related to the second cooking appliance.

Further, in the modifying of the at least one item (S1240), at least one item included in the selected recipe may be modified by changing at least one of ingredient information, amount information, cooking appliance information, or cooking order information included in the selected recipe based on the priorities of the plurality of context information.

In addition, the control method may further include displaying a UI that sequentially provides question information related to the plurality of context information and obtaining the plurality of context information based on answer information for the question information being sequentially input through the UI.

Figure 13:
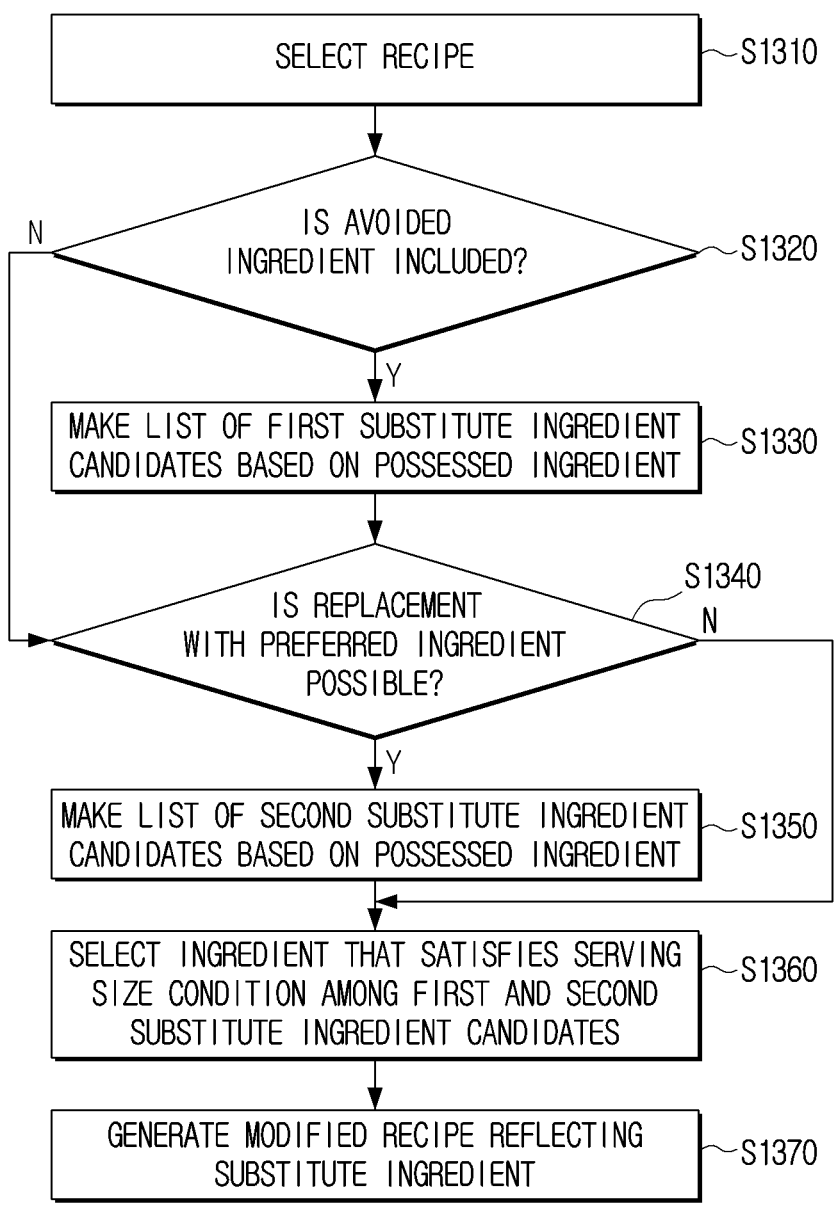
FIG. 13 is a diagram for explaining an example of a user-customized recipe generation method according to an embodiment of the disclosure.

FIG. 13 is a diagram for explaining an example of a user-customized recipe generation method according to an embodiment of the disclosure.

According to the user-customized recipe generation method for the electronic apparatus 100 illustrated in FIG. 13, the electronic apparatus 100 may modify a selected recipe based on priorities of a plurality of context information related to an eating preference of the user. For example, it is assumed that the avoided ingredient information of the user has the highest priority, followed by the preferred ingredient information and the serving size.

Referring to FIG. 13, based on a recipe being selected (S1310), the electronic apparatus 100 checks whether or not the recipe includes an ingredient that the user avoids (S1320). In case that the recipe includes the avoided ingredient (S1320: Y), the processor 130 may makes a list of first substitute ingredient candidates based on possessed ingredients (S1330). For example, it is assumed that the ingredients included in the selected recipe (a recipe of a pasta with cream sauce) are milk, eggs, pasta noodles, and bacon, the dining members are a member 1 and a member 2, the member 1 is allergic to milk, and the member 2 is allergic to wheat. In this case, the processor 130 may put soymilk on the list as a substitute ingredient for milk, and may put konjac and tofu noodles on the list as substitute ingredients for pasta noodles. In this case, the processor 130 may determine the substitute ingredient based on the ingredients possessed by the user.

Next, the electronic apparatus 100 checks whether or not the recipe includes an ingredient replaceable with a preferred ingredient (S1340). In case that the recipe includes an ingredient replaceable with a preferred ingredient (S1340: Y), the electronic apparatus 100 may make a list of second substitute ingredient candidates based on a preferred ingredient included in the possessed ingredients (S1350). For example, in case that preferred ingredients of the member 1 are shrimp and squid, the processor 130 may put shrimp and squid on the list as substitute ingredients for bacon.

Next, the electronic apparatus 100 selects ingredients that satisfy a serving size condition from among the first substitute ingredient candidates and the second substitute ingredient candidates (S1360). For example, in case that tofu noodles satisfy the serving size condition but konjac does not satisfy the serving size condition, the processor 130 may select soymilk and tofu noodles from among the first substitute ingredient candidates. In case that both tofu noodles and konjac satisfy the serving size condition, the processor 130 may provide a guide UI for selecting one of the two to the user. Further, the processor 130 may select a substitute ingredient in a similar manner for the second substitute ingredient candidates.

Then, the processor 130 generates a modified recipe reflecting the substitute ingredients (S1370).

Figure 14:
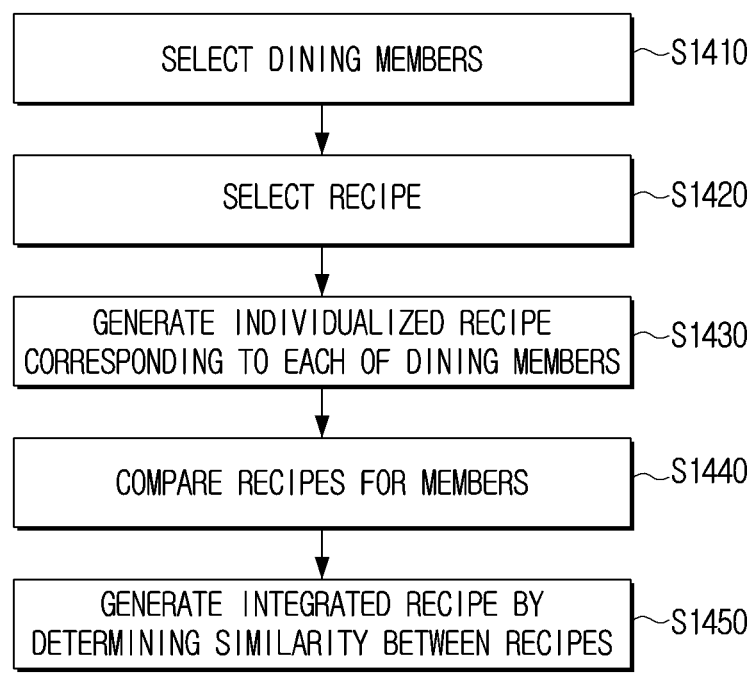
FIG. 14 is a diagram for explaining another example of the user-customized recipe generation method according to an embodiment of the disclosure.

FIG. 14 is a diagram for explaining another example of the user-customized recipe generation method according to an embodiment of the disclosure.

According to the user-customized recipe generation method illustrated in FIG. 14, based on dining members being selected (S1410) and a recipe being selected (S1420), the electronic apparatus 100 generates an individualized recipe corresponding to each dining member (S1430). In this case, the electronic apparatus 100 may generate the individualized recipe in the same manner as illustrated in FIGS. 12 and 13.

Subsequently, the electronic apparatus 100 compares between the recipes for the members (S1440).

Then, the electronic apparatus 100 determines a degree of similarity between the recipes to generate an integrated recipe (S1450). For example, the electronic apparatus 100 may generate an integrated recipe including a common item and an additional item based on the degree of similarity between the recipes, or an integrated recipe in which a weight for each member is reflected in each item.

According to various embodiments described above, user convenience is improved because a user-customized recipe modified by reflecting a priority of context information of a user is provided.

Meanwhile, the methods according to various embodiments of the disclosure described above may be implemented in the form of an application that may be installed in an existing electronic apparatus.

In addition, the methods according to the diverse embodiments of the disclosure described above may be implemented only by software upgrade or hardware upgrade for the existing electronic apparatus.

In addition, various embodiments of the disclosure described above may be implemented by an embedded server included in an electronic apparatus or at least one external server among electronic apparatuses.

Meanwhile, according to an embodiment of the disclosure, the diverse embodiments described above may be implemented as software including instructions stored in a machine-readable storage medium (e.g., a computer-readable storage medium). A machine may be a device that invokes the stored instruction from the storage medium and may be operated depending on the invoked instruction, and may include the electronic apparatus (e.g., the electronic apparatus A) according to the disclosed embodiments. In case that a command is executed by the processor, the processor may directly perform a function corresponding to the command or other components may perform the function corresponding to the command under a control of the processor. The command may include codes created or executed by a compiler or an interpreter. The machine-readable storage medium may be provided in the form of a non-transitory storage medium. Here, the "non-transitory storage medium" only means that it is a tangible device and does not contain a signal (for example, electromagnetic waves), and this term makes no distinction between a case where data is semi-permanently stored in the storage medium and a case where data is temporarily stored in the storage medium. For example, the "non-transitory storage medium" may include a buffer in which data is temporarily stored.

According to an embodiment, the methods according to the diverse embodiments disclosed in the document may be included and provided in a computer program product. The computer program product may be traded as a product between a seller and a purchaser. The computer program product may be distributed in the form of a machine-readable storage medium (for example, a compact disc read only memory (CD-ROM)) or distributed online (for example, downloaded or uploaded) through an application store (e.g., PlayStore™) or directly between two user apparatuses (for example, smartphones). In case of the online distribution, at least portions of the computer program product (for example, a downloadable app) may be at least temporarily stored in a machine-readable storage medium such as a memory of a server of a manufacturer, a server of an application store, or a relay server, or may be temporarily created.

In addition, each of components (e.g., modules or programs) according to the diverse embodiments described above may include a single entity or a plurality of entities, and some of the corresponding sub-components described above may be omitted or other sub-components may be further included in the diverse embodiments. Alternatively or additionally, some of the components (e.g., the modules or the programs) may be integrated into one entity, and may perform functions performed by the respective corresponding components before being integrated in the same or similar manner. Operations performed by the modules, the programs, or other components according to the diverse embodiments may be executed in a sequential manner, a parallel manner, an iterative manner, or a heuristic manner, at least some of the operations may be performed in a different order or be omitted, or other operations may be added.

Although embodiments of the disclosure have been illustrated and described hereinabove, the disclosure is not limited to the abovementioned specific embodiments, but may be variously modified by those skilled in the art to which the disclosure pertains without departing from the gist of the disclosure as disclosed in the accompanying claims. These modifications should also be understood to fall within the scope and spirit of the disclosure.

What is claimed is:

1. An electronic apparatus comprising:
a display;
a memory; and
a processor configured to:
assign priorities to a plurality of context information received in relation to preference of a user, respectively, and store the plurality of context information in the memory by mapping the plurality of context information with the assigned priorities to the user, the priorities being one of assignable by the user through a user interface displayed on the display and obtained by analyzing various activity data involving the user,
identify, based on a recipe being selected through the user interface, information of at least one item among items included in the selected recipe that has a higher priority among the priorities assigned to the plurality of context information through the user interface displayed on the display,
identify whether a respective context information of the at least one item identified as having the higher priority is inconsistent with the plurality of context information mapped to the user based on the plurality of context information stored in the memory in relation to the preference of the user,
generate a user-customized recipe specific to the user by referring to the mapping in the memory of the electronic apparatus, replacing the identified information of the at least one item from the selected recipe with another at least one item according to an order in which the priorities in relation to the preference of the user are assigned, and integrating the other at least one item with remaining items of the selected recipe, the user-customized recipe being further modifiable through the user interface, and
control the display to display the user-customized recipe including the other at least one item integrated with the remaining items of the selected recipe,
wherein the processor is further configured to:
obtain information regarding a cooking appliance possessed by the user and modify the at least one item included in the selected recipe based on the information regarding the cooking appliance, based on a type of a first cooking appliance referenced in the selected recipe and a type of a second cooking appliance possessed by the user being different, modify the selected recipe by changing an item related to the first cooking appliance referenced in the selected recipe to an item related to the second cooking appliance, wherein the processor is further configured to:
control the display to display a UI that sequentially provides question information related to the plurality of context information, and
obtain the plurality of context information based on answer information in response to the question information being sequentially input through the UI.

2. The electronic apparatus as claimed in claim 1, wherein the processor is further configured to:
based on a priority of first context information, among the priorities assigned to the plurality of context information, related to the at least one item included in the selected recipe being higher than a priority of second context information, among the priorities assigned to the plurality of context information, related to another item included in the selected recipe, preferentially modify the at least one item included in the selected recipe based on the first context information.

3. The electronic apparatus as claimed in claim 1, wherein the user is a first user, the user-customized recipe is a first customized recipe and the processor is further configured to:
obtain the first customized recipe for the first user based on a plurality of context information related to an eating preference of the first user,
obtain a second customized recipe for a second user based on a plurality of context information related to an eating preference of the second user,
obtain an integrated customized recipe including an item having a degree of similarity that is equal to or higher than a threshold based on a degree of similarity between items included in the first customized recipe for the first user and the second customized recipe for the second user, and
control the display to display the obtained integrated customized recipe.

4. The electronic apparatus as claimed in claim 3, wherein the processor is further configured to:
control the display to display the first customized recipe in association with the first user and the second customized recipe in association with the second user, and
control the display to display a guide user interface (UI) for integrating the first customized recipe for the first user and the second customized recipe for the second user.

5. The electronic apparatus as claimed in claim 1, wherein the user is a first user, and the processor is further configured to:
obtain a common recipe item based on common context information among a plurality of context information related to an eating preference of the first user and a plurality of context information related to an eating preference of a second user,
obtain an additional recipe item based on different context information among the plurality of context information related to the eating preference of the first user and the plurality of context information related to the eating preference of the second user, and
control the display to display an integrated customized recipe obtained based on the common recipe item and the additional recipe item.

6. The electronic apparatus as claimed in claim 1, wherein the user is among a plurality of users and the processor is further configured to:
modify the recipe by substituting an ingredient included in the selected recipe based on avoided ingredient information corresponding to each of the plurality of users,
obtain a respective customized recipe corresponding to each of the plurality of users based on preferred ingredient information of each of the plurality of users and the modified recipe, and
control the display to display the customized recipe.

7. The electronic apparatus as claimed in claim 1, wherein the processor is further configured to:
modify the at least one item included in the selected recipe by changing at least one of ingredient information, amount information, cooking appliance information, or cooking order information included in the selected recipe based on the priorities assigned to the plurality of context information.

8. The electronic apparatus as claimed in claim 1, wherein the plurality of context information include at least one of preferred ingredient information, avoided ingredient information, calorie information, cooking time information, possessed ingredient information, or family composition information.

9. A control method for an electronic apparatus, the control method comprising:
assigning priorities to a plurality of context information received in relation to preference of a user, respectively, and storing the plurality of context information in a memory by mapping the plurality of context information with the priorities to an identifier of the user, the priorities being one of assignable by the user through a user interface displayed on a display and obtained by analyzing various activity data involving the user;
modifying, based on a recipe being selected through the user interface, information of at least one item among items included in the selected recipe that has a higher priority among the priorities assigned to the plurality of context information;
identify whether a respective context information of the at least one item identified as having the higher priority is inconsistent with the plurality of context information mapped to the identifier of the user based on the plurality of context information stored in the memory in relation to the preference of the user;
generating a user-customized recipe specific to the user by referring to the mapping in the memory of the electronic apparatus, replacing the identified information of the at least one item from the selected recipe with another at least one item according to an order in which the priorities in relation to the preference of the user are assigned, and integrating the other at least one item with remaining items of the selected recipe, the user-customized recipe being further modifiable through the user interface; and
displaying the user-customized recipe including other at least one item integrated with the remaining items of the selected recipe,
wherein the control method further comprises:
obtain information regarding a cooking appliance possessed by the user and modify the at least one item included in the selected recipe based on the information regarding the cooking appliance, based on a type of a first cooking appliance referenced in the selected recipe and a type of a second cooking appliance possessed by the user being different, modify the selected recipe by changing an item related to the first cooking appliance referenced in the selected recipe to an item related to the second cooking appliance, wherein the control method further comprises:

control the display to display a UI that sequentially provides question information related to the plurality of context information, and obtain the plurality of context information based on answer information in response to the question information being sequentially input through the UI.

10. The control method as claimed in claim 9, wherein the modifying of the at least one item comprises:

based on a priority of first context information, among the priorities assigned to the plurality of context information, related to at least one item being higher than a priority of second context information, among the priorities assigned to the plurality of context information, related to another item, modifying preferentially the at least one item included in the selected recipe based on first context information.

11. The control method as claimed in claim 9, wherein the user is a first user, the user-customized recipe is a first customized recipe and the modifying of the at least one item comprises:

obtaining the first customized recipe for the first user based on a plurality of context information related to an eating preference of the first user and obtaining a second customized recipe for a second user based on a plurality of context information related to an eating preference of the second user; and obtaining an integrated customized recipe including an item having a degree of similarity that is equal to or higher than a threshold based on a degree of similarity between items included in the first customized recipe for the first user and the second customized recipe for the second user.

12. The control method as claimed in claim 11, wherein the displaying of the user-customized recipe comprises:

displaying the first customized recipe for the first user and the second customized recipe for the second user; and displaying a guide UI for integrating the first customized recipe for the first user and the second customized recipe for the second user.

13. The control method as claimed in claim 9, wherein the user is a first user, and the modifying of the at least one item comprises:

obtaining a common recipe item based on common context information among a plurality of context information related to an eating preference of the first user and a plurality of context information related to an eating preference of a second user, obtaining an additional recipe item based on different context information among the plurality of context information related to the eating preference of the first user and the plurality of context information related to the eating preference of the second user, and displaying an integrated customized recipe obtained based on the common recipe item and the additional recipe item.

14. The control method as claimed in claim 9, wherein the modifying of the at least one item comprises:

modifying the recipe by substituting an ingredient included in the selected recipe based on avoided ingredient information corresponding to each of the plurality of users, obtaining a respective customized recipe corresponding to each of the plurality of users based on preferred ingredient information of each of the plurality of users and the modified recipe, and displaying the customized recipe.

15. The electronic apparatus as claimed in claim 9, the control method further comprising:

obtaining information regarding a cooking appliance possessed by the user and modify the at least one item included in the selected recipe based on the information regarding the cooking appliance, wherein the modifying of the at least one item comprises:

based on a type of a first cooking appliance referenced in the selected recipe and a type of a second cooking appliance possessed by the user being different, modifying the selected recipe by changing an item related to the first cooking appliance referenced in the selected recipe to an item related to the second cooking appliance.

16. The electronic apparatus as claimed in claim 9, wherein the modifying of the at least one item comprises:

modifying the at least one item included in the selected recipe by changing at least one of ingredient information, amount information, cooking appliance information, or cooking order information included in the selected recipe based on the priorities assigned to the plurality of context information.

17. A non-transitory computer readable recording medium storing computer instructions that cause an electronic apparatus to perform an operation when executed by a processor of the electronic apparatus, the operation comprising:

assigning priorities to a plurality of context information received in relation to preference of a user, respectively, and storing the plurality of context information in a memory by mapping the plurality of context information with the priorities to an identifier of the user, the priorities being one of assignable by the user through a user interface displayed on a display and obtained by analyzing various activity data involving the user;

identifying, based on a recipe being selected through the user interface, information of at least one item among items included in the selected recipe that has a higher priority among the priorities assigned to the plurality of context information;

identify whether a respective context information of the at least one item identified as having the higher priority is inconsistent with the plurality of context information mapped to the identifier of the user based on the plurality of context information stored in the memory in relation to the preference of the user, generating a user-customized recipe specific to the user by referring to the mapping in the memory of the electronic apparatus, replacing the identified information of the at least one item from the selected recipe with another at least one item according to an order in which the priorities in relation to the preference of the user are assigned, and integrating the other at least one item with remaining items of the selected recipe, the user-customized recipe being further modifiable through the user interface; and displaying the user-customized recipe including the other at least one item integrated with the remaining items of the selected recipe, wherein the operation further comprises:
obtain information regarding a cooking appliance possessed by the user and modify the at least one item included in the selected recipe based on the information regarding the cooking appliance,
based on a type of a first cooking appliance referenced in the selected recipe and a type of a second cooking appliance possessed by the user being different, modify the selected recipe by changing an item related to the first cooking appliance referenced in the selected recipe to an item related to the second cooking appliance,
wherein the operation further comprises:
control the display to display a UI that sequentially provides question information related to the plurality of context information, and
obtain the plurality of context information based on answer information in response to the question information being sequentially input through the UI.

* * * * *